US 012506696B2

(12) United States Patent
Kasibhatla et al.

(10) Patent No.: US 12,506,696 B2
(45) Date of Patent: Dec. 23, 2025

(54) SLICED ROUTER FOR NETWORK ON A CHIP

(71) Applicant: Achronix Semiconductor Corporation, Santa Clara, CA (US)

(72) Inventors: Pavan Kumar Kasibhatla, Bengaluru (IN); Mohan Krishna Vedam, Bengaluru (IN); Kent Orthner, Santa Clara, CA (US)

(73) Assignee: Achronix Semiconductor Corporation, Santa Clara, CA (US)

( * ) Notice: Subject to any disclaimer, the term of this patent is extended or adjusted under 35 U.S.C. 154(b) by 321 days.

(21) Appl. No.: 18/232,076

(22) Filed: Aug. 9, 2023

(65) Prior Publication Data

US 2025/0055811 A1 Feb. 13, 2025

(51) Int. Cl.
*H04L 49/15* (2022.01)
*H04L 49/109* (2022.01)

(52) U.S. Cl.
CPC ............ *H04L 49/15* (2013.01); *H04L 49/109* (2013.01)

(58) Field of Classification Search
CPC .............................. H04L 49/15; H04L 49/109
See application file for complete search history.

(56) References Cited

U.S. PATENT DOCUMENTS

| 5,249,178 A | 9/1993 | Kurano et al. |
| 2005/0018665 A1 | 1/2005 | Jordan et al. |
| 2014/0177626 A1 | 6/2014 | Thottethodi et al. |
| 2014/0211628 A1 | 7/2014 | Mattes et al. |
| 2015/0003281 A1* | 1/2015 | Hasenplaugh ........ H04L 49/15 370/254 |
| 2016/0344629 A1* | 11/2016 | Gray ................... H04L 49/106 |
| 2021/0152469 A1* | 5/2021 | Bharadwaj ........... H04L 49/253 |
| 2021/0303509 A1* | 9/2021 | Swarbrick ............. H04L 45/42 |
| 2022/0006733 A1* | 1/2022 | Xu ....................... G06F 30/347 |

FOREIGN PATENT DOCUMENTS

| CN | 115550235 A | * 12/2022 | ........ H04L 45/586 |
| WO | WO-2023091363 A1 | * 5/2023 | ........ G06F 30/392 |
| WO | 2025034437 | 4/2025 | |

OTHER PUBLICATIONS

"International Application Serial No. PCT US2024 039975, International Search Report mailed Oct. 18, 2024", 2 pgs.
"International Application Serial No. PCT US2024 039975, Written Opinion mailed Oct. 18, 2024", 5 pgs.

* cited by examiner

*Primary Examiner* — Austin J Moreau
(74) *Attorney, Agent, or Firm* — Schwegman Lundberg & Woessner, P.A.

(57) ABSTRACT

A sliced router decomposes a router into a plurality of slices. Each slice has a subset of the input and output ports of the router. One or more of the slices may communicate with a network access point. Adjacent slices communicate with each other. In some example embodiments, there are dedicated physical channels between each slice and each adjacent slice for traffic coming in on or going out on ports of other slices. Within a slice, traffic may be arbitrated onto upstream or downstream channels going to the same output port. Each slice contains one or more crossbars, allowing data received on any input port to be routed to any output port of the slice. The crossbar of each slice is substantially smaller than the crossbar that would be used by a unified router.

16 Claims, 14 Drawing Sheets

SLICED ROUTER FOR NETWORK ON A CHIP

TECHNICAL FIELD

The subject matter disclosed herein generally relates to methods, systems, and machine-readable storage media for providing on-chip networking inside a Field Programmable Gate Array (FPGA).

BACKGROUND

FPGAs are increasingly being used for applications that require high-speed data communications, such as machine learning, networking acceleration, and storage acceleration. FPGAs may include high-frequency and high-throughput interfaces, but the internal capabilities of the FPGA are lacking for handling high throughputs due to the lower operating frequencies of the user logic in the FPGA core.

FPGAs are commonly used for networking applications, including packet switches and routers, deep packet inspection, compression, and encryption. Modern FPGAs support very high-throughput Ethernet networking interfaces such as 400 Gbps Ethernet to support these applications at these data rates.

BRIEF DESCRIPTION OF THE DRAWINGS

Various of the appended drawings merely illustrate example embodiments of the present disclosure and cannot be considered as limiting its scope.

DETAILED DESCRIPTION

Figure 1:
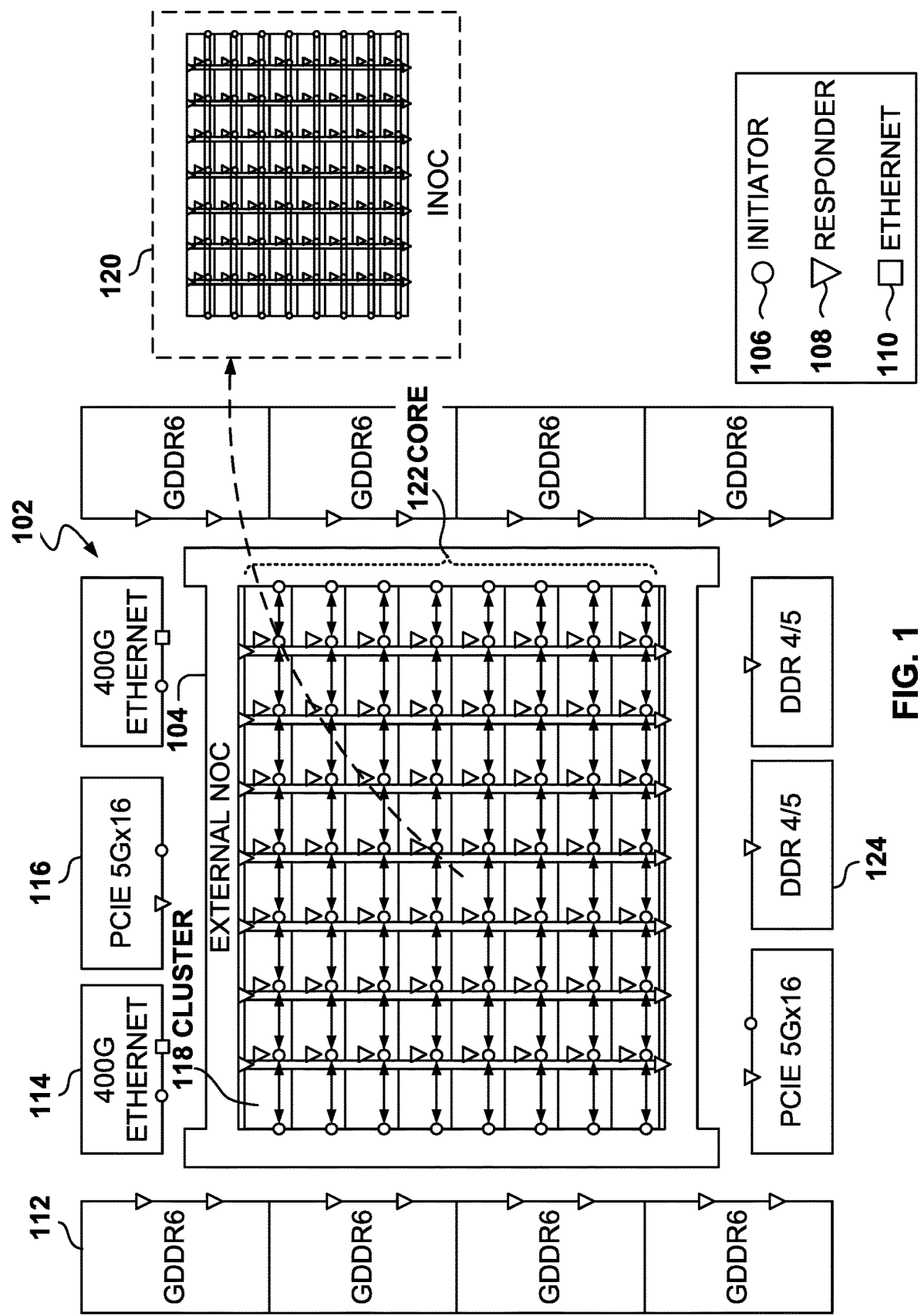
FIG. 1 illustrates the architecture of an FPGA with on-chip networking capabilities, according to some example embodiments.

Example methods, systems, and computer programs are directed to processing packets using a sliced router. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

An FPGA may include an internal network. The FPGA may have the ability to send data down the columns of the internal FPGA network to any row; support a variety of Network Access Points (NAP) arrangements for versatile development of FPGA designs; a packet mode to deliver a packet (e.g., an Ethernet packet) to a single NAP; multi-hop packet forwarding within the internal FPGA network; or any suitable combination thereof.

The FPGA (or other programmable integrated circuit) may include an internal network on chip (NoC) comprising NoC rows and NoC columns; clusters coupled to the NoC, each cluster comprising a network access point (NAP) and programmable logic; or any suitable combination thereof.

For example, the NoC may comprise 10 NoC columns and 8 NoC rows, with 80 clusters of reconfigurable FPGA logic at each column/row intersection. The NoC may enable communication among logic clusters and between logic clusters and external resources (e.g., memories, Ethernet, and the like).

Each NAP, where internal or external to the FPGA, has a unique identifier. The unique identifier allows the NoC to send information between NAPs. Within the two-dimensional grid of NoC, NAPs may send information in any direction, North, South, East, or West. A convention is used herein in which North, South, East, and West are used to refer to directions within a schematic of a circuit. This is merely a labeling convention for relative directions within a particular circuit design. Rotation of the design does not affect the functionality of the circuit.

When packets are transmitted between NAPs, each packet may be sent using one or more flow control units (flits). The first flit for a packet may be a head flit. The last flit for the packet may be a tail flit. Intermediate flits may be body flits. In some example embodiments, flits are about 300 bits wide. Each flit may include a destination identifier, a source identifier, flags (e.g., a start of packet flag or an end of packet flag), a type (e.g., command or response), data, or any suitable combination thereof. Each physical channel in the NoC may be comprised of a number of wires equal to the number of bits in a flit.

NAPs may operate as initiators or responders. A NAP initiator transmits command flits and receives response flits. For example, a NAP initiator may send a command flit to external memory to read data from an address and receive the data response. A NAP responder receives command flits and transmits response flits. For example, a NAP responder may receive a command flit to read data from an address and respond with the data.

The NoC columns may comprise a plurality of routers, one for each cluster in the column. The routers in the NoC receive flits from adjacent routers in each direction or from NAPs in the cluster. Each received flit is transmitted either to an adjacent router or to a NAP in the cluster. In some example embodiments, no flit may be received from one direction and transmitted in the same direction. For example, a flit received from the North could be sent South, West, East, or to a NAP, but not sent back North.

Virtual channels allow multiple packets to share physical paths by time multiplexing. Each packet may be assigned a virtual channel by the sending router. Each router may have data storage for one or more flits on each virtual channel. When a head flit of a packet arrives at an output port of a router, the output port assigns a virtual channel to the packet. Flits for the packet are stored in a FIFO (first-in, first-out) buffer for the assigned virtual channel while waiting for access to the physical output channel. The FIFO is released for use by another packet when the tail flit for the packet leaves the FIFO. An arbiter controls which virtual channel is permitted to use the physical data during each clock cycle.

Physical channels may use a ready/valid protocol. The recipient device (a router or NAP) raises the ready signal when the device is ready to receive data. The sending device sets the values on the data lines and raises the valid signal when the data is valid. The recipient device accesses the data lines, clears the ready line, and then raises the ready line when the recipient device is ready to receive additional data. Each virtual channel may use separate ready/valid signaling. Accordingly, the recipient device only indicates that a virtual channel is ready to receive data while there is space in the FIFO for the virtual channel. A credit system may be used to allow sending devices to predict whether data for each virtual channel is likely to be accepted.

An FPGA may have highly skewed areas available for routers. For example, one dimension of the router (e.g., North/South) may be 10 or 20 times the other dimension (or even more). The longer dimension provides many wires to cross the smaller dimension, but the smaller dimension provides few wires to cross the longer dimension. Multi-layer designs allow access to additional wires, but lower-level tracks have higher latency. As a result, the latency in the smaller dimension (e.g., West/East) may be lower than the latency in the other dimension (e.g., North/South). Thus, there exists an operating frequency at which communications in the smaller dimension will not need to be buffered because each flit can be transmitted in a single cycle; communications in the longer dimension will need to be buffered because each flit cannot be transmitted in a single clock cycle.

A sliced router decomposes a router into a plurality of slices. In some example embodiments, four slices are used. Each slice has a subset of the external input and output ports of the router. For example, each slice may have one external input port and one external output port. One or more of the slices may communicate with a NAP. Adjacent slices communicate with each other via internal ports. In some example embodiments, the internal ports comprise dedicated physical channels for traffic coming in on or going out on external ports of other slices. No single slice provides the full functionality of a router, but by intercommunication between the slices, full router functionality is provided by the sliced router.

Within a slice, traffic being routed to the same output port may be arbitrated. For example, the router may receive data from the North and West, both being routed to the East. An arbitrator determines which input data will be routed first. Each slice contains one or more crossbars, allowing data received on any input port to be routed to any output port of the slice. The crossbar of each slice is substantially smaller than the crossbar that would be used by a unified router.

A unified router that fully connects two local NAPs and four adjacent routers would have six inputs and six outputs for each input, a total of thirty-six routes. However, in some implementations, traffic is not permitted to be routed from a source to the same source. For example, data received from the East cannot be routed back to the East. Furthermore, the local NAPs may use a different method for intra-cluster communication and the router may not provide NAP-to-NAP connections. Thus, the possible thirty-six routes become only twenty-eight routes, not including the six loopback routes and the two routes for bidirectional NAP-to-NAP communication. If each flit has 300 bits, with one wire for each, the crossbar would include 300×28 wires, or at least 8,940 wires. In many implementations, such a large crossbar is infeasible. Compared to unified routers, the sliced router discussed herein provides a substantial reduction in the wires used and a substantial reduction in the wire density (e.g., measured in wire resources per square micrometer) with a small increase in latency for some traffic.

FIG. 1 illustrates the architecture of an FPGA 102 with on-chip networking capabilities, according to some example embodiments. The FPGA 102 includes an external NoC 104 and an internal NoC 120, which provide high-throughput and easy-to-use access between peripherals and the FPGA core 122. The FPGA core 122 is surrounded by the external NoC 104 and includes the clusters 118, which are units of programmable logic configurable by the user.

A plurality of external interfaces may exchange data with the outside of the FPGA 102, such as Ethernet controller 114, PCIe controller 116, and GDDR6 controller 112. The external interfaces may be connected directly to the clusters 118. The Ethernet controller 114 may provide an Ethernet interface 110 between external devices and the external NoC 104.

In some example embodiments, the external NoC 104 and the internal NoC 120 support read/write transactions between initiators and responders. The initiator may control the functioning of the responder. For example, the initiator may be able to initiate transactions (e.g., by sending requests), while the responder waits for any initiator to send a request. The external NoC 104 may also support cut-through and store-and-forward communications.

The initiators may include PCIe controller 116, user-implemented initiators in the FPGA core 122, and an FPGA control unit (FCU) (allowing bitstream commands to read and write peripheral control and status (CSR) interfaces). The responders may include GDDR6 controllers 112, DDR-4/5 controllers 124, user-implemented responders in the FPGA core 122, PCIe controller 116, the FCU (allowing initiators in the subsystem, such as PCIe, to configure the FPGA 102), and CSR interfaces of clusters 118 (e.g., including phase lock loops (PLLs), Input/Outputs, top-level clock/reset, or any suitable combination thereof).

In some example embodiments, the internal NoC 120 is implemented with regularly-spaced elements in the FPGA core 122, and the internal NoC 120 includes a plurality of columns and a plurality of rows. The example illustrated in FIG. 1 includes seven columns and eight rows, but other embodiments may use a different number of columns and rows (e.g., 10 columns or rows, in the range from 1 to 50 or more, or other numbers).

The internal NoC 120 and external NoC 104 transport packets and provide a packet-transfer interface to the clusters 118. In some example embodiments, the packet interface supports Advanced Extensible Interface (AXI) read and write transactions. AXI is part of the Advanced Microcontroller Bus Architecture (AMBA), which is an open-standard, on-chip interconnect specification for the connection and management of functional blocks in system-on-a-chip (SoC) designs.

The user logic in the cluster 118 can issue AXI read or write transactions to a local NAP in the cluster 118. Based on the routing logic, the internal NoC 120 carries the transaction to the external NoC 104 at the east, west, north, or south boundary of the FPGA core 122. Adjacent clusters 118 may be fully connected, such that transactions may be routed from any one of the clusters 118 to any adjacent one of the clusters 118.

The internal NoC 120 supports multiple traffic types, including transaction data and packet data streams. The transaction data includes read and write commands, data, and responses. The command transfers are typically a single cycle, and data transfers are typically short, with 16-cycle transactions being common.

The traffic types include Cache Coherent Interconnect for Accelerators (CCIX) data, packet data, and raw user data. In some example embodiments, the internal NoC 120 carries CCIX data from the PCIe controller 116 when working in CCIX mode. This is presented to the user as a CSX-protocol formatted data stream, which is effectively a segmented interface that the user unpacks.

The packet data may be bundled as longer streams of data. In some example embodiments, the internal NoC 120 imposes no upper limit on packet sizes. Further yet, with regards to raw user data transport, the internal NoC 120 transports flits between NAPs, and the flits are combined to form the packets.

In some example embodiments, the external NoC 104 is a ring around the FPGA core 122 that carries transactions from the outside of the external NoC 104 to the clusters 118, and vice-versa, as well as between clusters 118. In some example embodiments, the external NoC 104 provides address decoding, transaction command and response routing, message-width adaptation, frequency adaptation (e.g., clock domain crossing), burst adaptation, and protocol conversion.

The external NoC 104 carries read and write transactions. In some example embodiments, the external NoC 104 does not carry Ethernet packets, SerDes data, or CCIX data, and does not carry interrupt information. However, other embodiments may transport one or more of Ethernet packets, Serdes data, CCIX data, and carry interrupt information.

The combination of internal NoC 120 and external NoC 104 may allow any access point in the FPGA 102 to access any interface IP responder interface, including any of the GDDR6 controller 112, DDR-4/5 controller 124, and PCIe controller 116 interfaces.

In some example embodiments, each memory interface presents a responder (e.g., with a data path width of 256 bits) to the NoC 104 and accepts read and write transactions. Further, PCIe initiators 106 and responders 108 are connected directly to the external NoC 104 in the example of FIG. 1.

A NoC node, or simply referred to herein as a node, is a component of the network that is connected, and in communication with, other nodes. Each node comprises at least one router to direct network traffic within the node (e.g., to a NAP of the node) or to another node (e.g., based on a destination identifier of a packet).

The router makes routing decisions for the flits travelling on the network and the NAP "slows" the transfer of data from the high-speed NoC network to the lower speeds of the user logic in the cluster 118. The NAP also formats the data into the corresponding protocol, such as Ethernet or AXI.

CXS, or CXS interface, refers to the CCIX Stream Interface. A Graphics Dual Data Rate Memory (GDDR), or GDDR6, is a memory unit (JEDEC standard 6.0 is inferred unless specified otherwise). A Dual Data Rate Memory (DDR), or DDR4, is a memory unit (JEDEC standard 4.0 is inferred unless specified otherwise). A WAW flit is a special kind of flit encapsulating both write data channel and write address channel in the same flit, allowing for more efficient data transport. The Ethernet Interfacing Unit (EIU) is the interface that sends Ethernet data to internal NoC columns. Further, a CCIX Interfacing Unit (CXIU) is the interface that sends CXS data to internal NoC columns.

A router at each node is independent from other routers and drives incoming flits to either the next node (next router) or towards the corresponding local NAP. Each router decides if the flit is consumed in the node or forwarded to the next node based on a destination ID field in the flit. In some example embodiments, the flit has a 12-bit transport information and a 291-bit payload, but other formats are possible. The flit payload is utilized to carry various types of data, and in the case of AXI transactions, the 291-bit payload carries AXI signals. In non-AXI flits, the flits are configured to encapsulate raw data, Ethernet packets, or CXS streams. Multiple flit formats are supported for different types of loads.

AXI transactions may be supported by attaching one of the

In the case of AXI transactions, a router is attached to a responder NAP 108, which acts as an AXI responder to the user logic. The router is attached to the initiator NAP 106, which acts as an AXI initiator over the user logic. Hence, the user logic is enabled to generate requests, receive responses, receive commands, and generate responses, communicating with other logic anywhere in the FPGA 102.

In the case of raw data transfers, the initiator NAP 106 or the responder NAP 108 generates raw data flits, which are received by another NAP. The transfer happens through the routers of the iNoC 120.

In the case of CXS flits, the NAP receives and generates the CXS flits, where each CXS flit encapsulates a CXS stream and is carried through the internal NoC 120 infrastructure towards the CXIU, which interfaces with PCIe or CCIX.

In the case of Ethernet flits, the NAP receives and generates the Ethernet packets. Each Ethernet flit encapsulates an Ethernet packet in full or in part. The internal NoC 120 infrastructure carries the data to the EIU, which handles the interfacing with the Ethernet MAC. This way, the internal NoC 120 supports both memory-mapped data-transport infrastructure as well as pure data-stream-transport infrastructure.

Thus, the NoC provides a high-speed network that runs around the outside of the user logic, using very fast links (e.g., 2 gigahertz) that are thousands of bits wide, resulting in much lower latency and much higher throughput path to that memory without the user having to design any intermediate cluster 118 for communications. Thus, the FPGA may be unprogrammed and the PCIe controller 116 is able to talk to the DDR-4/5 controller 124 without any FPGA configuration. This allows the better use of user logic for the user's programmable functions.

In some example embodiments, the NoC is a transaction network that supports reads and writes. A read may be requested from any address and a write may be performed to any address.

To benefit from the NoC functionality, the user instantiates and configures a NAP in their design. To access the variety of IP visible through the NoC, the user configures the NAP. Further, to use the NoC to communicate between clusters 118 on the FPGA 102, the user instantiates NAP blocks at each node, and uses standard interfaces, such as AXI or Packet interfaces, or even uses the user's own interfaces. In summary, the NoC carries multiple types of traffic simultaneously.

For example, the user instantiates 256-bit NAPs in their design to gain access to the internal NoC 120. Assuming the user's design is able to meet a frequency of 600 MHz, a single NAP provides 153.6 Gbps of read throughput and 153.6 Gbps of write throughput.

Figure 2:
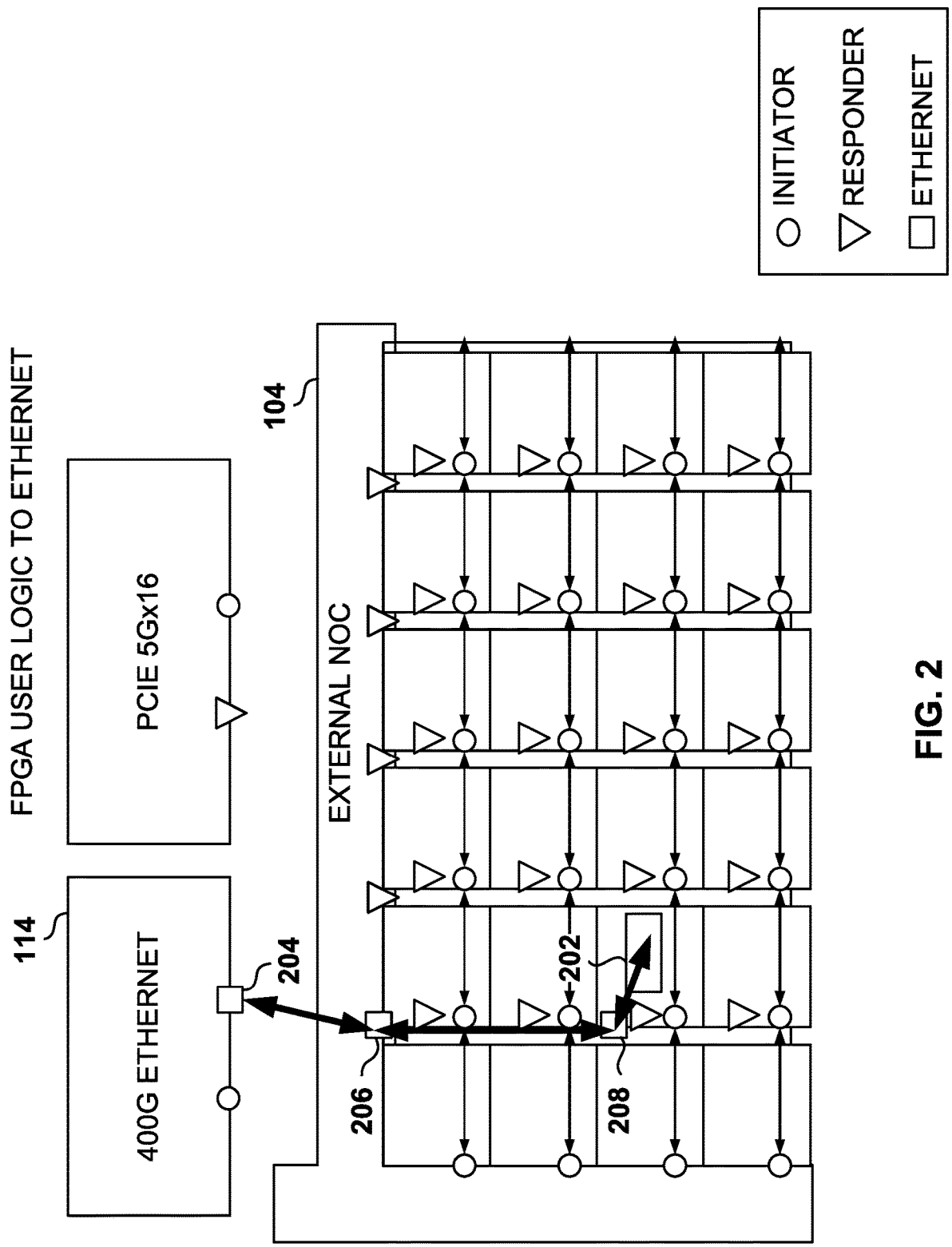
FIG. 2 illustrates an Ethernet connection to user logic, according to some example embodiments.

FIG. 2 illustrates an Ethernet connection to user logic, according to some example embodiments. In some example embodiments, the Ethernet controller 114 supports up to 400 Gbps of throughput, although other speeds may be supported, such as 200G and 100G.

In some example embodiments, the Ethernet controller 114 is connected directly to one or more columns of the internal NoC 120, which allows the Ethernet controller 114 to issue packets directly to one of the internal NoC columns without having to travel through the external NoC 104. In other example embodiments, the Ethernet packets may be transferred through the external NoC 104 and may be transferred to any column.

In the example illustrated in FIG. 2, an Ethernet packet is sent from interface 204 to the router 206 on top of the internal NoC column, where the router 206 supports the transfer of Ethernet packets. The internal NoC column carries the packet to the correct row, where it is delivered to the router 208 that is configured for packet transport. The router 208 then transfers the packet to the user logic 202 via the local NAP. The reverse data transfer follows the same path in the reverse direction.

In some example embodiments, for Ethernet packet transfers, 288 bits are transferred in every flit. The 288-bit data carries data to a single router 208 as specified in the flit. To interface with user logic in Ethernet mode, the router 208 reuses AXI data signals along with 32-bit additional signals. The Ethernet data is presented to the user logic on the same 288-bit interface used by CXS and raw-data transport. Further, the Ethernet packet may be encapsulated with additional information in the flit.

In some example embodiments, the NAP is able to translate the Ethernet format and protocol to AXI format and protocol. For example, the NAP may receive Ethernet packets, translate the data to AXI, and store the translated data in a memory location. This may be done by the NAP logic, or by logic in the FPGA adjacent to the NAP. Thus, the internal NoC columns support the transport of multiple types of protocol, including Ethernet and AXI.

Figure 3:
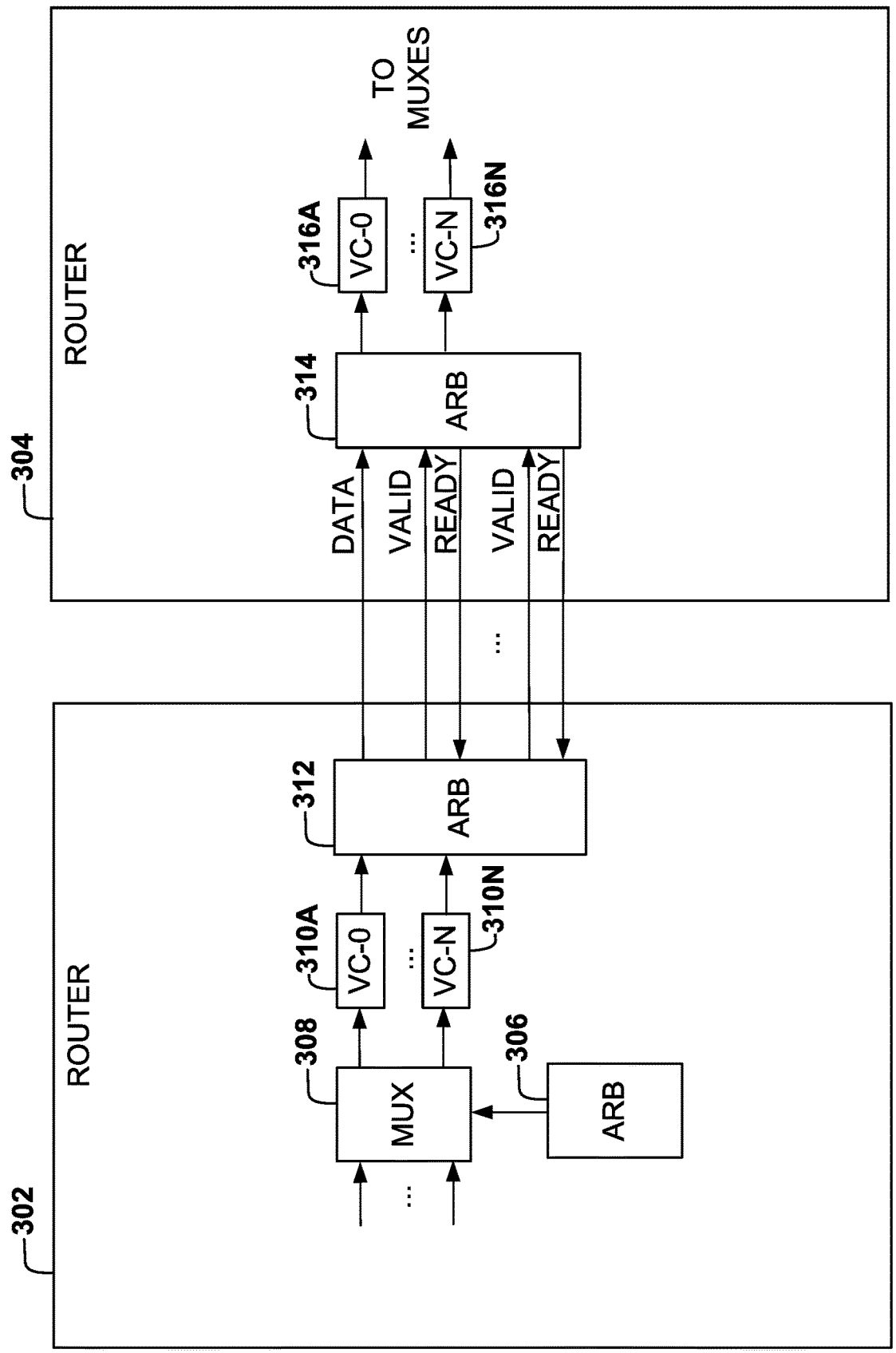
FIG. 3 illustrates communication between two routers in an FPGA, according to some example embodiments.

FIG. 3 illustrates communication between two routers 302 and 304 in an FPGA, according to some example embodiments. The routers 302 and 304 may be routers of two clusters 118 of FIG. 1. The router 302 includes a multiplexer 308, an input arbiter 306, FIFOs 310A-310N, and an output arbiter 312. The router 304 includes an input arbiter 314 and FIFOs 316A-316N.

Multiple input flits may be received by the router 302 that are all being routed to the router 304. For example, input flits may be received from routers to the north, west, and south of the router 302, all of which are routed east, to the router 304. To support this, FIFOs 310A-310N allow for storage of flits until they are sent. The arbiter 312 determines which of the FIFOs 310A-310N is processed each clock cycle. All flits of a single packet are stored in the same one of the FIFOs 310A-310N.

The router 304 receives data from the router 302. The arbiter 314 determines which of the FIFOs 316A-316N to write a received flit to. Each of the FIFOs 316A-316N may be associated with a virtual channel and a separate pair of ready/valid signals. Thus, the arbiter 314 will not assert that a virtual channel is ready to accept data unless the corresponding one of the FIFOs 316A-316N has space available to store the data. Data from the FIFOs 316A-316N are routed to output multiplexers according to the destination of the flits of each of the FIFOs 316A-316N. For example, flits having an output destination to be reached via a north output port are directed to a multiplexer that controls output to the north output port, flits having an output destination to be reached via a south output port are directed to a multiplexer that controls output to the south output port, and so on.

For simplicity, an output portion of the router 302 is shown connecting to an input portion of the router 304. Bidirectional communication is enabled by also including an output portion in the router 304 connected to an input portion of the router 302. The routers 302 and 304 may be connected, bidirectionally, to additional routers. For example, each of the clusters 118 of FIG. 1 may include a router that is connected to the router of each adjacent cluster. Thus, a router of a corner cluster would be connected to two adjacent clusters, a router of a non-corner edge cluster would be connected to three adjacent clusters, and routers of non-edge clusters would be connected to four adjacent clusters. The input to the multiplexer 308 may come from input ports on one or more other edges of the router 302. Thus, as shown in FIGS. 1-2, each router enables communication in multiple directions.

Figure 4:
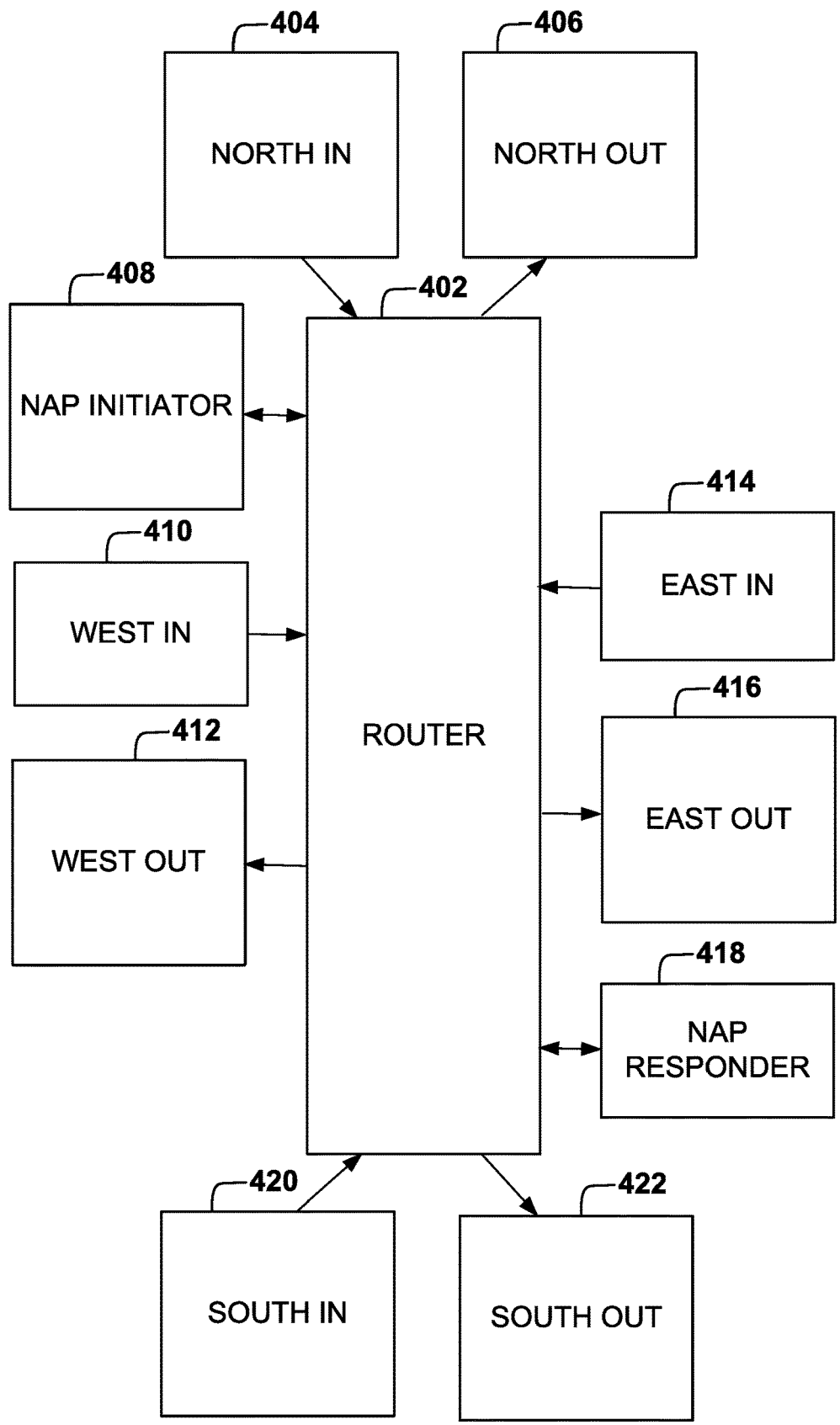
FIG. 4 illustrates external connections to a sliced router, according to some example embodiments.

FIG. 4 illustrates external connections to a sliced router 402, according to some example embodiments. The sliced router 402 is rectangular in shape and is longer in the North/South dimension than in the West/East dimension. The shape of the sliced router 402 may be defined by a first measurement in one dimension and a second measurement in an orthogonal dimension. The longer measurement of the dimensions of the sliced router 402 may be two, three, four, or more times as long as the shorter measurement.

Routers in the NoC of FIGS. 1-2 receive flits from adjacent routers in the North, South, West, and East directions, via external input ports shown as North In 404, South In 420, West In 410, and East In 414. Each of the external input ports 404, 410, 414, 420 may be coupled to an external output port of an adjacent router, which may be a sliced router. Each router may also receive flits from NAP initiator 408 and NAP responder 418, within the cluster of the router. Routers also transmit flits to adjacent routers in the North, South, West, and East directions, via external output ports shown as North Out 406, South Out 422, West Out 412, and East Out 416. Each of the external output ports 406, 412, 416, 422 may be coupled to an external input port of an adjacent router. The external ports on the same side of the sliced router 402 (e.g., North In 404 and North Out 406) may be coupled to the same router. Routers may also transmit data to the NAP initiator 408 and the NAP responder 418. In some example embodiments, U-turns are disallowed (e.g., the sliced router 402 will not route data received from North In 404 to North out 406), but all other routes are allowed.

The sliced router 402 may be configured to route traffic across the shorter dimension (e.g., from West to East or East to West) in a single clock cycle and to take multiple clock cycles to route traffic across the longer dimension (e.g., from North to South or South to North).

Figure 5:
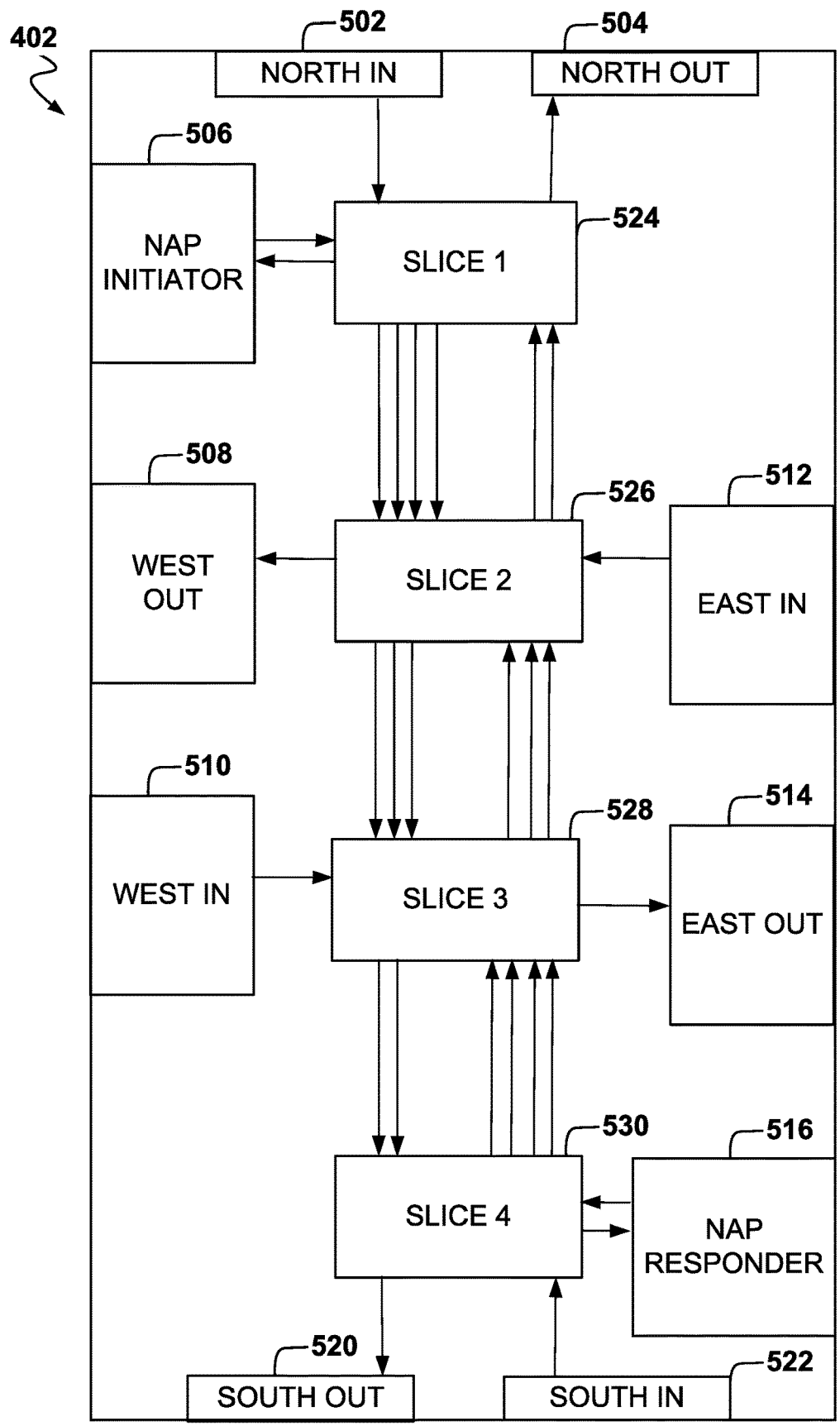
FIG. 5 illustrates connections among slices of the sliced router of FIG. 4, according to some example embodiments.

FIG. 5 illustrates connections among slices of the sliced router 402 of FIG. 4, according to some example embodiments. The North In 502, South In 522, West In 510, and East In 512 receive data directed to the sliced router 402 from adjacent routers in the North, South, West, and East directions. The North Out 504, South Out 520, West Out 508, and East Out 514 send data from the sliced router 402 to the adjacent routers in the North, South, West, and East directions. FIG. 5 adds additional detail to FIG. 4 by showing the slices 524, 526, 528, and 530 of the sliced router 402. The number and direction of the arrows connecting each pair of adjacent slices 524-530 corresponds to the number and direction of physical channels.

As used herein with respect to the sliced router, internal channels and ports refer to the connections between slices of the router. External channels and ports refer to the connections between the sliced router and other devices (e.g., NAPs or other routers).

The slice 524 communicates bidirectionally with the router to the North via the North In 502 and the North Out 504. The slice 524 also uses an external bidirectional port to communicate bidirectionally with the NAP initiator 506. Thus, the slice 524 has two external output ports and two external input ports. A dedicated physical channel is provided from the slice 524 to the slice 526 for each different output destination of flits received by the slice 524 from the North In 502 or the NAP initiator 506. Since the slice 524 handles output to the North Out 504 and the NAP initiator 506, the remaining output destinations are the West Out 508, the East Out 514, the South Out 520, and the NAP responder 516. Thus, there are four internal output connections (and channels of an internal output port) from the slice 524 to the slice 526. Likewise, the slice 524 receives data from the slice 526 destined for the North Out 504 and the NAP initiator 506, each on a dedicated channel of an internal input port.

The slice 526 receives input from the East In 512 and provides output to the West Out 508. As discussed above, the slice 526 also communicates bidirectionally with the slice 524. Additionally, the slice 526 has a dedicated physical output channel to the slice 528 for each output handled by the slice 528. Flits being routed to the East Out 514, the South Out 520, and the NAP responder 516 will be routed to the slice 528. Flits being routed to the West Out 508 are sent in that direction by the slice 526 without further intermediation. Flits being routed to the North Out 504 or the NAP initiator 506 are routed to the slice 524.

Also, a dedicated internal physical channel is provided from the slice 528 to the slice 526 for each different destination of flits received by the slice 528 that is routed by the slice 526. Since the slice 526 will route packets to the West Out 508 or to the slice 524 for output to the North Out 504 or the NAP initiator 506, there are three internal input connections to the slice 526 from the slice 528. Thus, for the connection of the slices 526 and 528, unlike the connections of each other pair of adjacent slices, the number of physical channels of the internal input and internal output ports in each direction is equal.

The slice 528 receives external input from the West In 510 and provides external output to the East Out 514. As discussed above, the slice 528 also communicates bidirectionally with the slice 526. Additionally, the slice 528 has a dedicated physical internal output channel to the slice 530 for each output handled by the slice 530. Flits being routed to the South Out 520 and the NAP responder 516 will be routed to the slice 530. Flits being routed to the East Out 514 are sent in that direction by the slice 528 without further intermediation. Flits being routed to the North Out 504, the West Out 508, or the NAP initiator 506 are routed to the slice 526.

A dedicated internal physical channel is also provided from the slice 530 to the slice 528 for each different destination of flits received by the slice 530 that is routed by the slice 528. Since the slice 528 will route packets to the East Out 514 or to the slice 526 for output to the North Out 504, the West Out 508, or the NAP initiator 506, there are four internal input channels of the internal input port of the slice 528 that receives data from the slice 530.

The slice 530 communicates bidirectionally with the router to the South via the external South In 522 and the external South Out 520 ports. The slice 530 also communicates bidirectionally with the external NAP responder 516. As discussed above, there are dedicated internal physical channels to receive flits from the slice 528 and send flits to the slice 528, based on the destination of each flit. Since there are more outputs handled by the slice 528 (and the slices 524 and 526, which the slice 528 can route flits to) than are handled by the slice 530, there are more physical channels to send data from the slice 530 to the slice 528 than in the other direction.

As can be seen in FIG. 5, the number and type of connections for the four slices 524-530 differ. For example, the slices 524 and 530 each have six internal channels and four external channels while the slices 526 and 528 each have twelve internal channels and two external channels. Similarly, between each adjacent pair of the four slices 524-530, there are a total of six internal channels, but the number of channels carrying traffic in each direction differs. Between the slice 524 and the slice 526, four channels carry traffic to the South and two channels carry traffic to the North. Between the slices 526 and 528, three channels carry traffic in each direction. And between the slices 528 and 530, two channels carry traffic to the South and four channels carry traffic to the North.

FIG. 5 is an example of an embodiment in which dedicated channels are provided for inter-slice communications for each output port. As a result, each slice provided full parallel processing of all output ports. Additionally, once the packet enters the router from an external port and an internal channel is selected by the receiving slice, intermediate slices do not need to make any additional routing decisions.

In an alternative embodiment, fewer channels are provided for inter-slice communications. In these embodiments, multiple output ports may share the same physical channel, reducing the number of wires used to communicate between slices. However, to support the sharing of physical channels between output ports, each intermediating slice will determine the correct routing of each flit.

Figure 6:
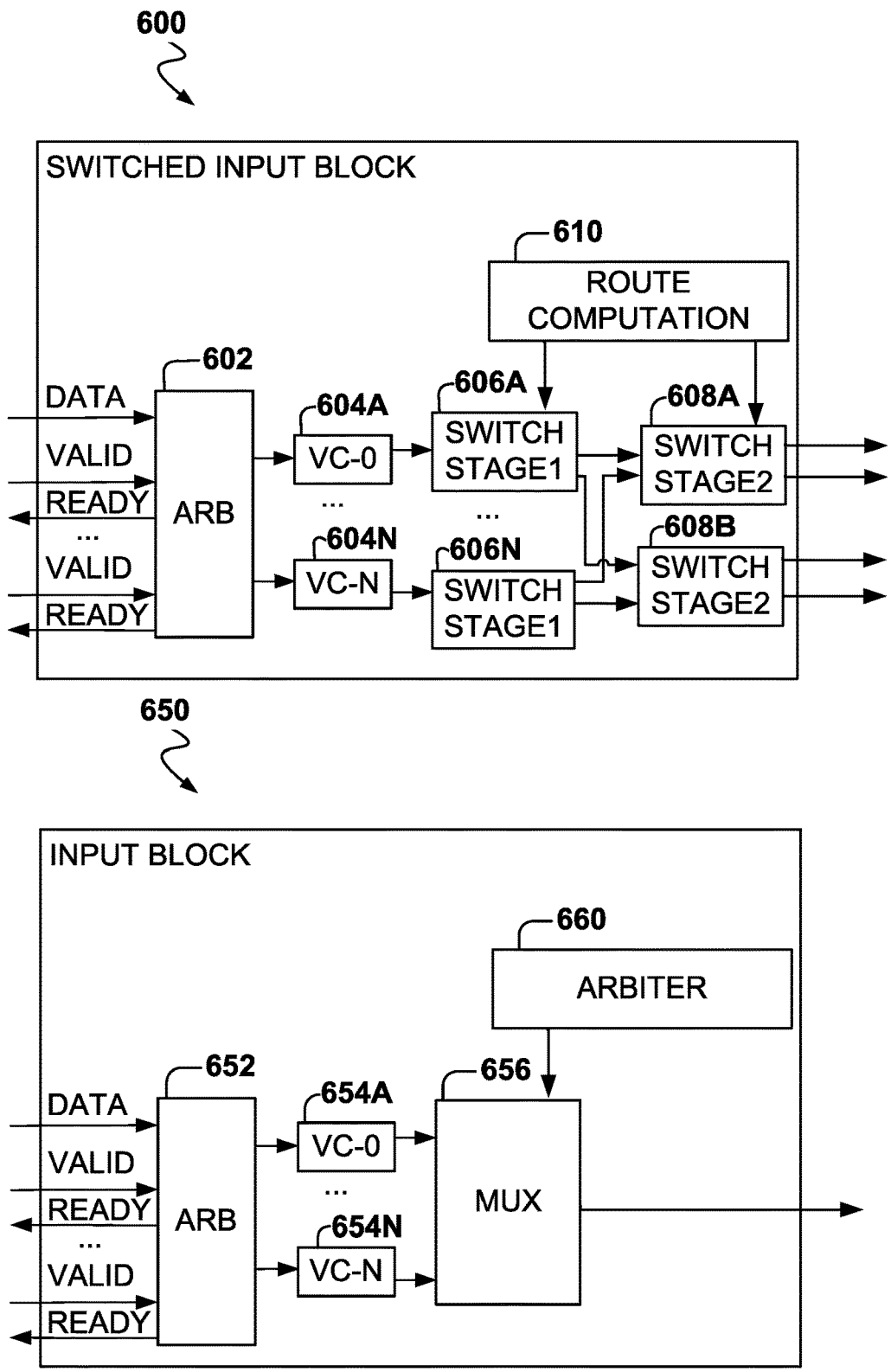
FIG. 6 illustrates an input block component of a router slice, according to some example embodiments.

FIG. 6 illustrates a switched input block component 600 and an input block component 650 of a router slice, according to some example embodiments. The switched input block component 600 comprises an arbiter 602, FIFOs 604A-604N, stage one switches 606A-606N, stage two switches 608A and 608B, and route computation unit 610. The input block component 650 comprises an arbiter 652, FIFOs 654A-654N, an arbiter 660, and a multiplexer 656.

The arbiter 602 provides a ready signal to an output of a device (e.g., another router or a NAP) that sends data to the router slice. In response to detecting that the ready signal is raised, if the sending device has data to send, the sending device sets the data value (e.g., a 300-bit flit) and raises the valid signal. In response to detecting that the valid signal is raised, the arbiter reads the data value and lowers the ready signal. The ready signal will be reasserted when the arbiter 602 is ready to process additional data. A separate ready/valid pair may be used for each virtual channel. Accordingly, the arbitrator 602 indicates that it is ready to receive data only for virtual channels having a corresponding one of the FIFOs 604A-604N that has space to accept the data.

The arbiter 602 determines a virtual channel for the received flit and stores the data in a corresponding one of the FIFOs 604A-604N (for N+1 virtual channels). Data from each of the FIFOs 604A-604N is fed into a corresponding one of the stage one switches 606A-606N. Based on the destination identifier of the flit, the route computation unit 610 determines whether the flit is routed to the stage two switch 608A or the stage two switch 608B. Each of the stage two switches 608A-608B corresponds to a different output direction of the router slice. Thus, if the router slice provides output to the North, the South, and a NAP, the router slice will have three stage two switches.

Each stage two switch 608A-608B receives flits destined for a single output direction of the router slice. The stage two switch determines which port of the output direction to use to send the flit to its destination. For example, in FIG. 5, the slice 524 has three output ports to send data to the South, to the slice 526. Thus, all traffic for the slice 526 is provided to a single stage two switch, which then determines which of the three output ports to write the data to.

The input block component 650 receives data on an input channel that is dedicated to an output direction of the router slice. The arbiter 652 provides a ready signal to an output of a device (e.g., another router slice) that sends data to the router slice. In response to detecting that the ready signal is raised, if the sending device has data to send, the sending device sets the data value (e.g., a 300-bit flit) and raises the valid signal. In response to detecting that the valid signal is raised, the arbiter reads the data value and lowers the ready signal. The ready signal will be reasserted when the arbiter 652 is ready to process additional data. A separate ready/valid pair may be used for each virtual channel. Accordingly, the arbitrator 652 indicates that it is ready to receive data only for virtual channels having a corresponding one of the FIFOs 654A-654N that has space to accept the data.

The arbiter 652 determines a virtual channel for the received flit and stores the data in a corresponding one of the FIFOs 654A-654N (for N+1 virtual channels). Data from each of the FIFOs 654A-654N is fed into the multiplexer 656. The multiplexer 656 provides data from a selected one of the FIFOs 654A-654N, as controlled by the arbiter 660. The output of the multiplexer 656 is the output of the input block component 650.

Figure 7:
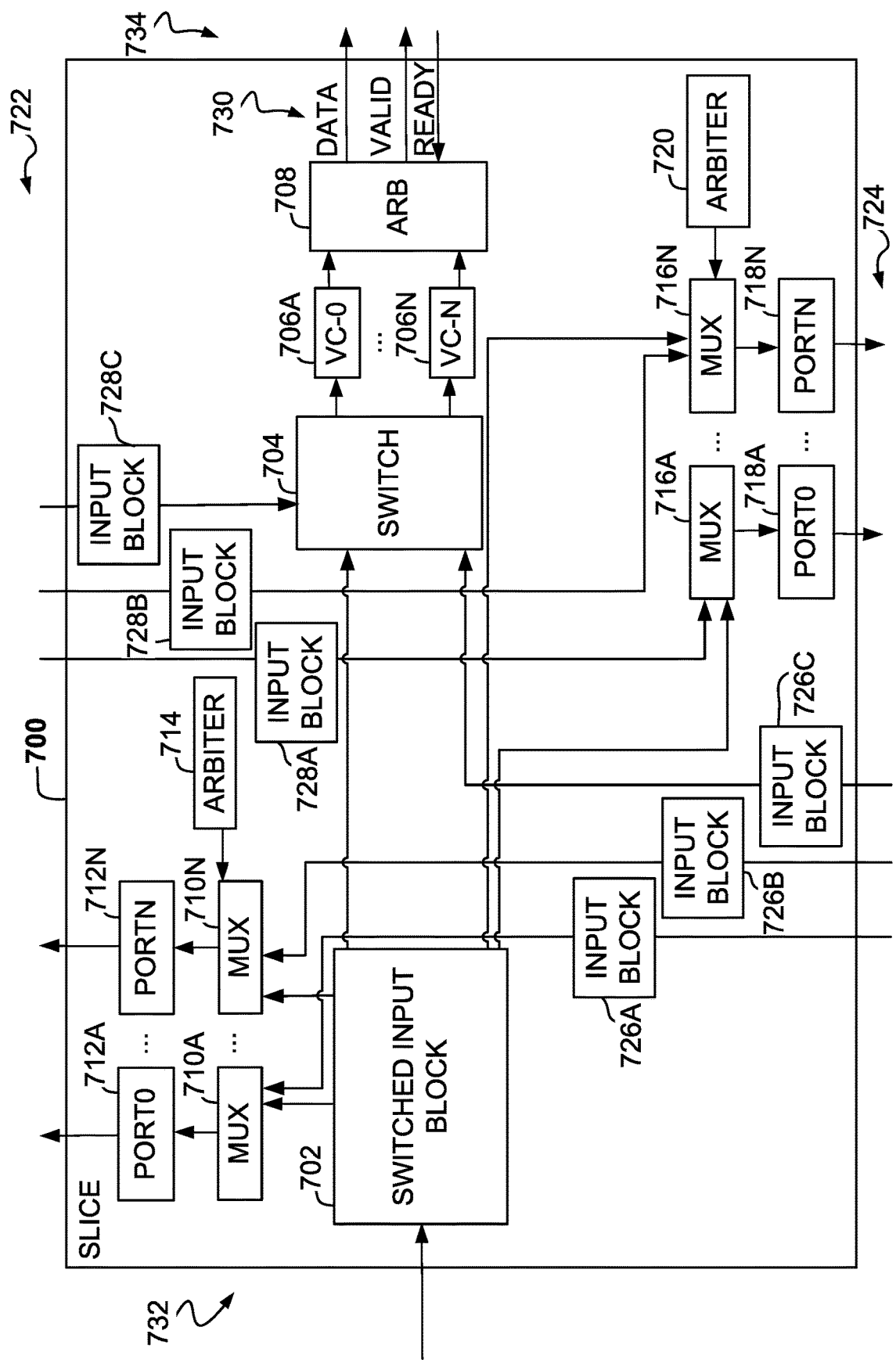
FIG. 7 illustrates a general architecture of a router slice, according to some example embodiments.

FIG. 7 illustrates a general architecture of a router slice 700, according to some example embodiments. The router slice 700 includes a switched input block 702 (depicted as the switched input block component 600 in FIG. 6); input blocks 726A, 726B, 726C, 728A, 728B, and 728C (depicted as the input block component 650 in FIG. 6); a switch 704; FIFOs 706A-706N; arbiters 708, 714, and 720; multiplexers 710A-710N and 716A-716N; and output ports 712A-712N, 718A-718N, and 730. The router slice 700 is connected in each of the four directions 722, 724, 732, and 734. The connections in the directions 722 and 724 may be to adjacent router slices and the connections in directions 732 and 734 may be to other routers or to NAPs.

The switched input block 702 receives data on one physical channel from the direction 732. The stage two switches of the switched input block 702 direct the received data to one of the output ports 712A-712N, 706A-706N, or 718A-718N. If the output port is in the direction 722 or 724, the data is directed to one of the multiplexers 710A-710N or 716A-716N dedicated to the output port. If the output port is in the direction 734, the data is directed to the switch 704 for provision to one of the FIFOs 706A-706N, arbitrated by the arbiter 708 for output on the port 730.

Input data is also received from the directions 722 and 724. A separate input physical channel is used for each output physical channel. The input block 726A receives data destined for the multiplexer 710A that selects data to be sent via port 712A in the direction 722. The input block 726B receives data destined for the multiplexer 710N that selects data to be sent via the port 712N in the same direction. In this example, two inputs are received from the direction 724 and routed to the direction 722, but any number of inputs may be supported. The input block 726C receives data destined for the direction 734. The received data is routed to the switch 704.

From the direction 724, the input blocks 728A and 728B route data to the multiplexers 716A and 716N, for output on the dedicated port 718A or 718N corresponding to the input block. The input block 728C routes data to the switch 704, for eventual output on the port 730.

Each of the multiplexers 710A-710N and 716A-716N receives data from multiple sources and destined for a single output port. For example, the multiplexer 710A receives data from the switched input block 702 and the input block 726A. The arbiter 714 controls the multiplexers 710A-710N to determine which of the various inputs to provide as output in the direction 722. The arbiter 720 controls the multiplexers 716A-716N to determine which of the various inputs to provide as output in the direction 724.

The switch 704 also receives data from multiple sources that is destined for the single output port 730. In this example, the switch 704 receives data from the switched input block 702, the input block 726C, and the input block 728C. The inputs may be stored in FIFOs 706A-706N. In some example embodiments, the number of FIFOs is equal to the number of inputs to the switch 704 (e.g., three). The arbiter 708 selects data from one of the FIFOs 706A-706N for transmission on the port 730.

Figure 8:
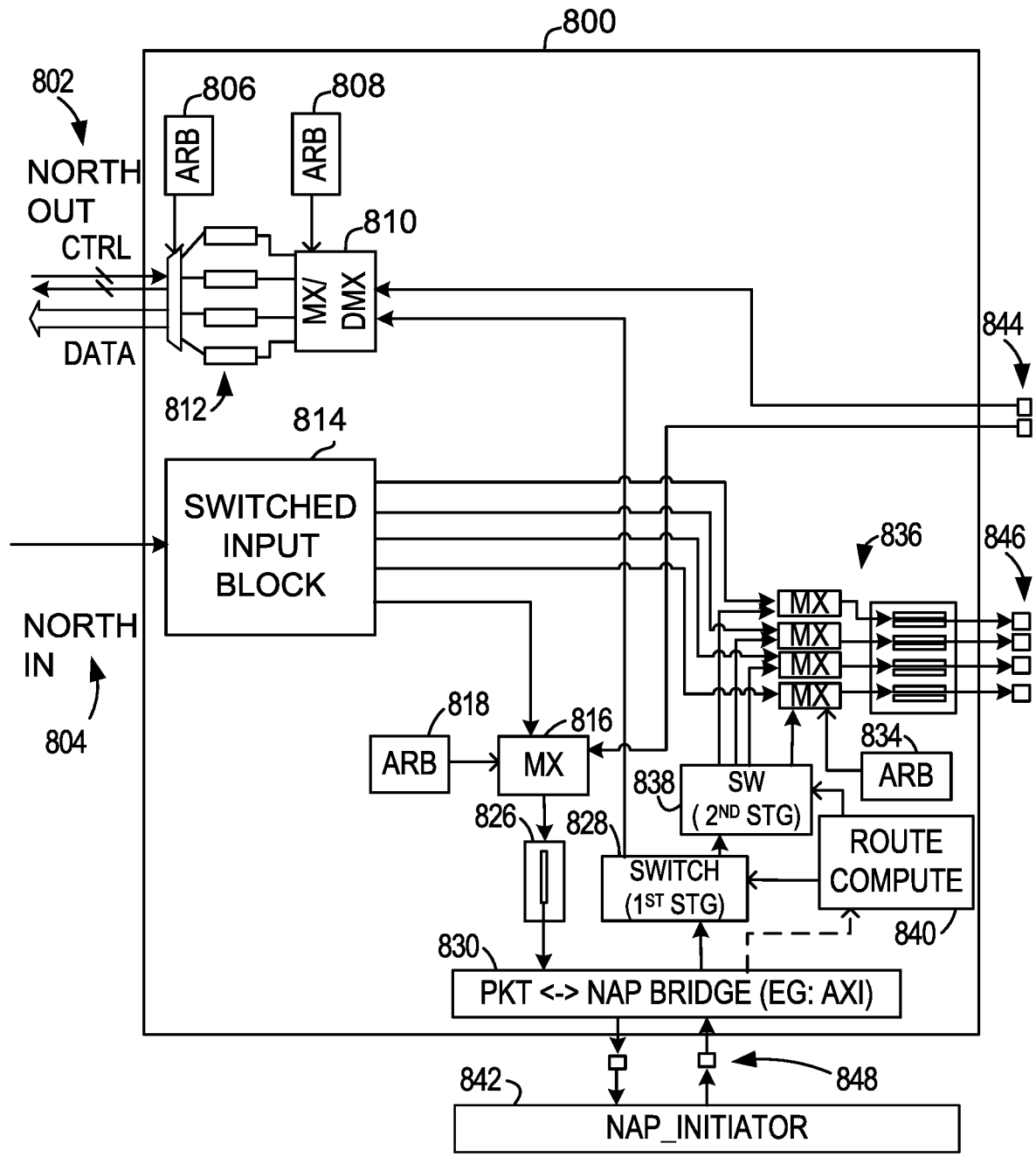
FIGS. 8-11 illustrate example architecture of four slices composing a sliced router, according to some example embodiments.

FIGS. 8-11 illustrate example architecture of four slices composing a sliced router, according to some example embodiments. FIG. 8 illustrates an example of a first slice 800.

The first slice 800 connects to an adjacent router (e.g., an adjacent sliced router) via the input port 804 and the output port 802. Data received on the input port 804 is handled by the switched input block 814, which directs the data to the multiplexer 816 for provision to the bridge 830 or to the output block 836. Depending on the external output port to which the data is addressed, the switched input block 814 directs the data to a corresponding one of the multiplexers of the output block 836 or to the multiplexer 816.

Data is also received from the NAP initiator 842 via an input channel of an external bidirectional port 848. The data is processed by the packet/NAP bridge 830, which converts the data from an external communication protocol (e.g., AXI) to an internal communication protocol (e.g., Ethernet). The received data is provided to the first stage switch 828, controlled by the route compute 840 to direct the received data to the second stage switch 838 or the multiplexer/demultiplexer 810.

Data may also be received from an adjacent router slice via the internal input port 844, comprising two physical channels. One of the two physical channels of the port 844 is dedicated to data to be routed to the external output port 802 in the North direction. The multiplexer/demultiplexer 810, controlled by the arbiter 808, routes the data received from the ports 844 and the NAP initiator 842 to the FIFOs 812. The arbiter 806 selects from the FIFOs 812 to provide data to the external output port 802.

The other physical channel of the port 844 is dedicated to data to be routed to the NAP initiator 842 and is provided to the multiplexer 816 for multiplexing with data received from the external input port 804. The multiplexer 816 is controlled by the arbiter 818 and provides output data to the FIFO 826. The bridge 830 converts the NoC packets to the communication format used by the NAP initiator 842 and sends data to the NAP initiator 842 via an external output channel of the external bidirectional port 848.

The second stage switch 838 and the second stage switches of the switched input block 814 (shown as stage two switches 608A-608B in FIG. 6) provide data to the output block 836, comprising multiplexers that select between the two inputs as controlled by the arbiter 834. The outputs of the multiplexers fill the four FIFOs that correspond to four physical channels of the internal output port 846. Each one of the four physical channels of the internal output port 846 corresponds to a different external output port of the sliced router. For example, one of the channels of the port 846 may send traffic destined for a West external output port, one may send traffic destined for an East external output port, one may send traffic destined for a South external output port, and one may send traffic destined for a NAP responder device.

Absent congestion, the slice 800 may be able to route traffic from any of the input or bidirectional ports 804, 844, 848 to any of the output or bidirectional ports 802, 846, 848 in a single clock cycle. Thus, traffic between the NAP initiator 842 and the router coupled to the North may be processed in a single clock cycle, but traffic between the external ports 802, 804, 848 of the slice 800 and other external ports of the sliced router may incur additional delay from one or more other slices 900, 1000, 1100 of FIGS. 9-11. In some example embodiments, the time to transit the slice 800 is greater than a single clock cycle. Nonetheless, the time for data transfers that use only a single slice remains less than the time for data transfers that cross slices.

The number of physical channels of the internal input port 844 may be equal to the sum of the number of physical channels of the outport port 802 with the number of physical output channels of the bidirectional port 848. This allows for each physical channel of the internal input port 844 to be dedicated to an output physical channel of the first slice 800. In this example, data received from the second slice 900 of FIG. 9 will not be routed back to the second slice 900 via the internal output port 846. Accordingly, there are no physical channels of the input port 844 that are dedicated to traffic to be routed to the internal output port 846.

Figure 9:
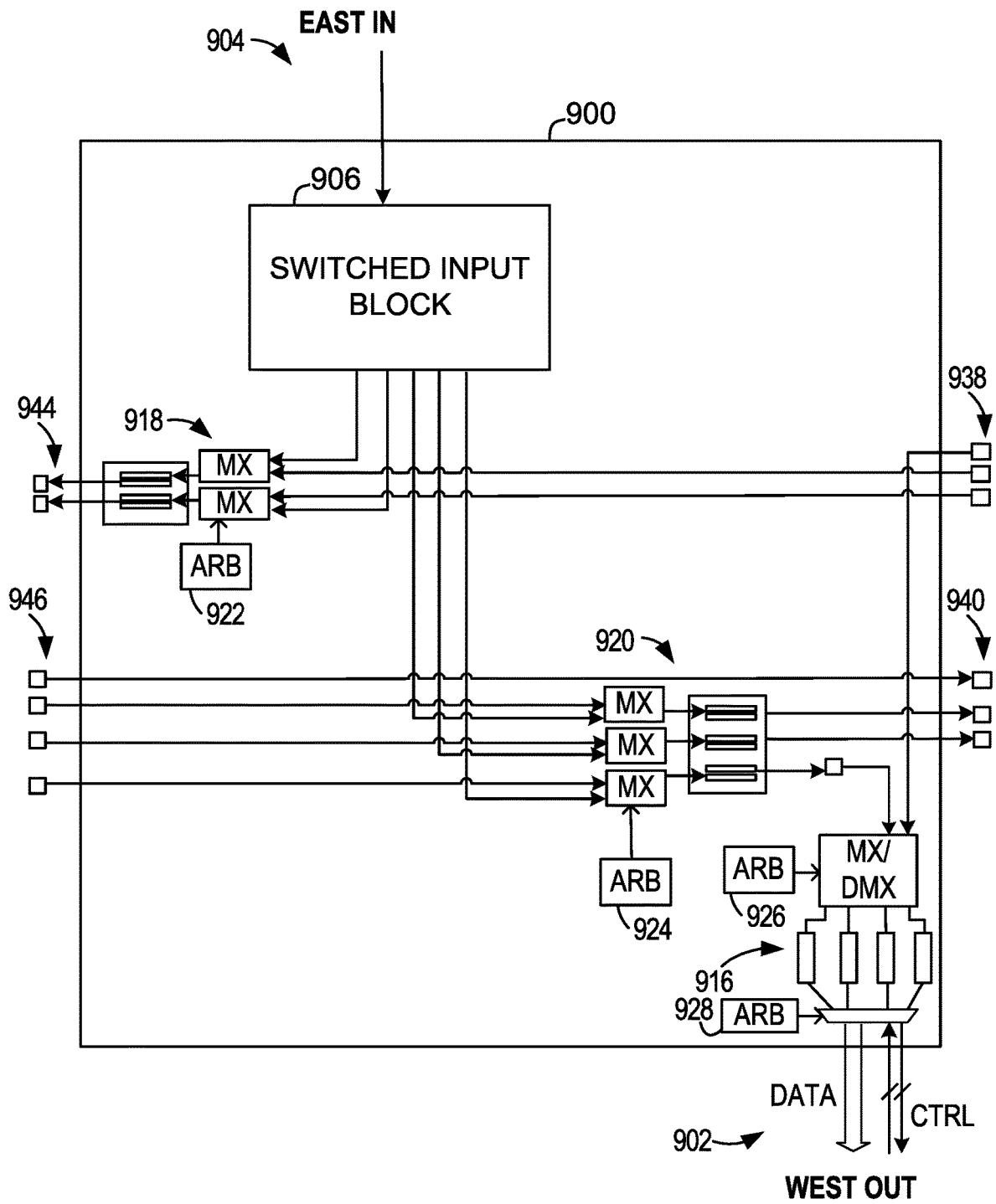

FIG. 9 illustrates an example of a second slice 900. The second slice 900 connects to the first slice 800 via the internal input port 946 and the internal output port 944 and to a third slice 1000 of FIG. 10 via the internal input port 938 and the internal output port 940. The internal output port 944 is coupled to the internal input port 844 of FIG. 8. The internal input port 946 is coupled to the internal output port 846 of FIG. 8. Each of the physical channels of the internal input port 946 is dedicated to receiving data for a different external output port of the sliced router. For example, one of the physical channels of the input port 946 receives data for a West external output port, one receives data for an East external output port, one receives data for a South external output port, and one receives data for a NAP responder port. Since the first slice 800 handles the North and NAP initiator ports, no data comes to the second slice 900 from the first slice 800 for those destinations.

Each of the physical channels of the input port 938 is also dedicated to receiving data for a different external output port of the sliced router. For example, one of the physical channels of the input port 938 receives data for a North external output port, one receives data for a West external output port, and one receives data for a NAP initiator port.

The only input data received by the second slice 900 with an East external output port destination (routed to one of the physical channels of the output port 940) comes from one of the physical channels of the input port 946. Accordingly, the input and output ports may be connected without the use of a multiplexer or arbiter. Traffic destined for the South external output port or the NAP responder output port may be received from the East external input port 904 or the internal input port 846. Accordingly, the output block 920 uses multiplexers and FIFOs, controlled by the arbiter 924, to merge the received traffic. Similarly, traffic destined for the West external output port 902 may originate from a physical channel of the internal input port 938, a physical channel of the internal input port 946, or the East external input port 904. Accordingly, the output block 916 makes use of a multiplexer/demultiplexer, controlled by the arbiter 926 and FIFOs that feed into a multiplexer controlled by the arbiter 928 to direct traffic to the West external output port 902.

Traffic destined for the North external output port or the NAP initiator port of the sliced router (shown in FIG. 8 as external output port 802 and the bridge 830) is routed to the first slice 800 via the internal output port 944. Traffic for those destinations may be received from the East external input port 904 or a physical channel of the input port 938. Accordingly, the multiplexers 918, controlled by the arbiter 922, select between these two inputs for providing output to the internal output port 944.

Figure 10:
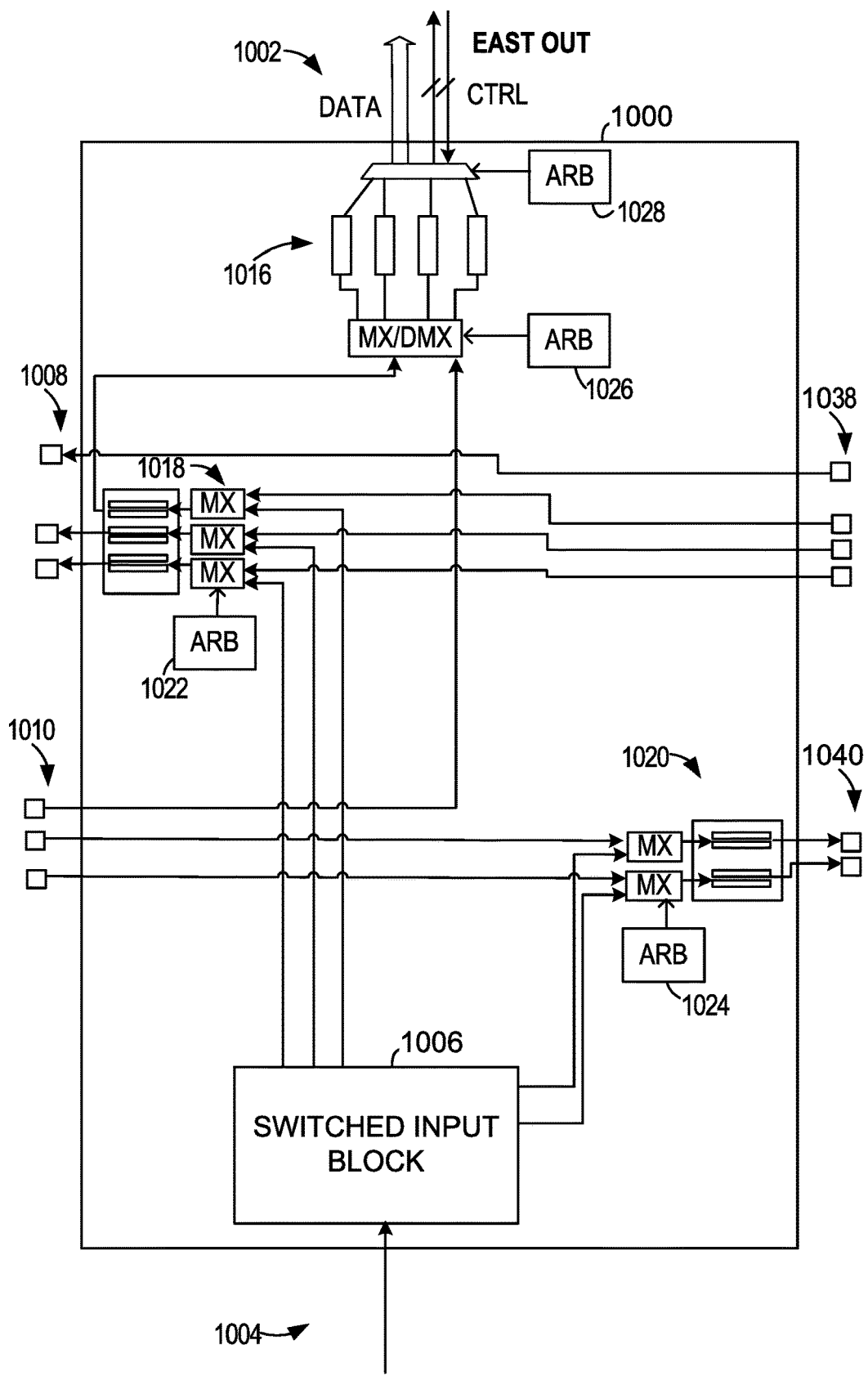

Traffic destined for the East external output port or the NAP responder port of the sliced router is routed to the third slice 1000 of FIG. 10 via the output port 940. Traffic for those destinations may be received from the first slice 800 or the East external input port 904. Accordingly, the output block 920 comprises multiplexers controlled by the arbiter 924 to select between these two inputs for providing output to two of the physical channels of the internal output port 940.

Input traffic received from the East external input port 904 is handled by the switched input block 906 and routed to one of the multiplexers 918 (for North or NAP initiator destinations) or 920 (for West, South, or NAP responder destinations).

Absent congestion, the slice 900 may be able to route traffic from any of the input ports 904, 938, 946 to any of the output ports 902, 944, 940 in a single clock cycle. Thus, traffic between the East external input port 904 and the West external output port 902 may be processed in a single clock cycle, but traffic between the external ports 902 and 904 of the slice 900 and other external ports of the sliced router may incur additional delay from one or more other slices 800, 1000, 1100 of FIGS. 8 and 10-11.

As shown in FIGS. 8 and 9, the number of physical channels of the internal output port 846 is four and the number of physical channels of the internal output port 944 is two. Thus, the number of channels of the internal output port 846 is different than the number of channels of the internal output port 944.

Also as shown in FIGS. 8 and 9, the number of channels of the internal output port 846 is equal to the sum of a number of channels of the external output port 902 and a number of channels of the internal output port 940. Having a dedicated input channel on the internal input port 946 for each output channel of the slice 900 increases throughput of the slice 900.

FIG. 10 illustrates an example of a third slice 1000. The third slice 1000 connects to the second slice 900 via the internal input port 1010 and the internal output port 1008 and to a fourth slice 1100 of FIG. 11 via the internal input port 1038 and the internal output port 1040. The internal output port 1008 is coupled to the internal input port 938 of FIG. 9. The internal input port 1010 is coupled to the internal output port 940 of FIG. 9. Each of the physical channels of the internal input port 1010 is dedicated to receiving data for a different external output port of the sliced router. For example, one physical channel of the input port 1010 receives data for an East external output port, one receives data for a South external output port, and one receives data for a NAP responder port. Since the first slice 800 handles the North external output port and the NAP initiator port and the second slice 900 handles the West external output port, no data comes to the third slice 1000 from the second slice 900 for those destinations.

Each physical channel of the internal input port 1010 is also dedicated to receiving data for a different external output port of the sliced router. For example, one physical channel of the internal input port 1010 receives data for a North external output port, one receives data for a West external output port, one receives data for an East external output port, and one receives data for a NAP initiator port.

The only input data received by the third slice 1000 with a West external output port destination (routed to one of the internal output ports 1008) comes from one of the physical channels of the internal input port 1038. Accordingly, the input and output ports may be connected without the use of a multiplexer or arbiter. Traffic destined for the South external output port or the NAP responder output port may be received from the West external input port 1004 or one of physical channels of the input port 1010. Accordingly, the output block 1020 uses multiplexers and FIFOs, controlled by the arbiter 1024, to merge the received traffic. Similarly, traffic destined for the East external output port 1002 may originate from one of the physical channels of the input port 1038, one of the physical channels of the input port 1010, or the West external input port 1004. Accordingly, the output block 1016 makes use of makes use of a multiplexer/demultiplexer, controlled by the arbiter 1026 and FIFOs that feed into a multiplexer controlled by the arbiter 1028 to direct traffic to the East external output port 1002.

Traffic destined for the West external output port, the North external output port, or the NAP initiator port of the sliced router is routed to the second slice 900 of FIG. 9 via the output port 1008. Traffic for those destinations may be received from the fourth slice 1100 or the West external input port 1004. Accordingly, the output block 1018 comprises multiplexers controlled by the arbiter 1022 to select between these two inputs for providing output to the port 1008.

Traffic destined for the South external output port or the NAP responder port of the sliced router (shown in FIG. 11 as external output port 1102 and external bidirectional port 1148) is routed to the fourth slice 1100 via the internal output port 1040. Traffic for those destinations may be received from the West external input port 1004 or one of the internal input ports 1010. Accordingly, the multiplexers of the output block 1020, controlled by the arbiter 1024, select between these two inputs for providing output to the two physical channels of the internal output port 1040.

Input traffic received from the West external input port 1004 is handled by the switched input block 1006 and routed to one of the multiplexers of the output block 1018 (for North, East, or NAP initiator destinations) or the output block 1020 (for South or NAP responder destinations).

Absent congestion, the slice 1000 may be able to route traffic from any of the input ports 1004, 1010, 1038 to any of the output ports 1002, 1008, 1040 in a single clock cycle. Thus, traffic between the West external input port 1004 and the East external output port 1002 may be processed in a single clock cycle, but traffic between the external ports 1002 and 1004 of the slice 1000 and other external ports of the sliced router may incur additional delay from one or more other slices 800, 900, 1100 of FIGS. 8-9 and 11.

Figure 11:
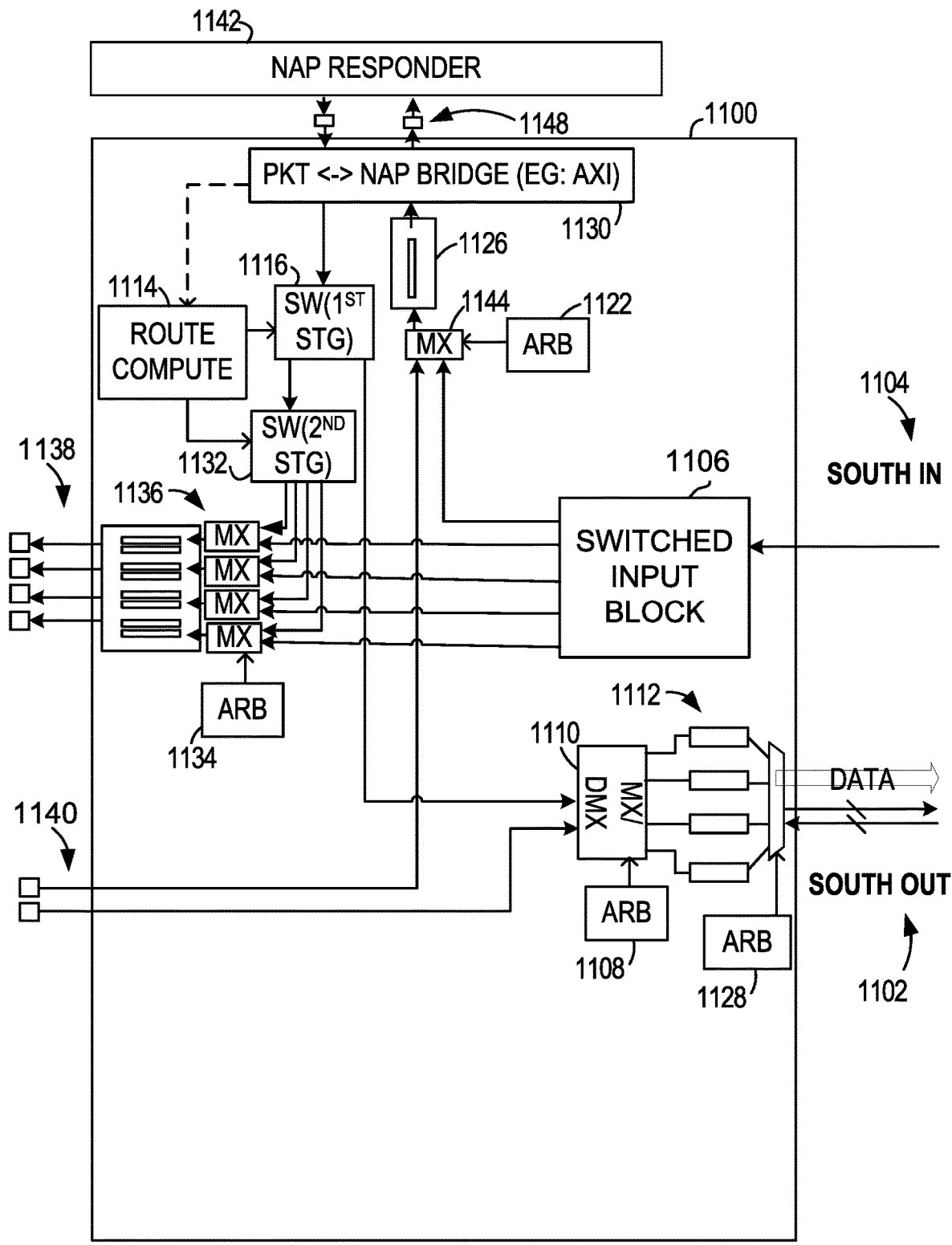

FIG. 11 illustrates an example of a fourth slice 1100. The fourth slice 1100 connects to an adjacent router (e.g., an adjacent sliced router) via the external input port 1104 and the external output port 1102. Data received on the external input port 1104 is handled by the switched input block 1106 and, based on its eventual external output port (North, West, East, NAP initiator, or NAP responder), directed to the multiplexer/demultiplexer 1110, the multiplexer 1144, or one of the multiplexers of the output block 1136.

Data is also received from the NAP responder 1142 via the external bidirectional port 1148 and processed by the packet/NAP bridge 1130. The received data is provided to the first stage switch 1116, controlled by the route compute 1114 to direct the received data to the second stage switch 1132 or the multiplexer/demultiplexer 1110.

Data may also be received from an adjacent router slice via the internal input port 1140. The internal output port 1138 is coupled to the internal input port 1038 of FIG. 10. The internal input port 1140 is coupled to the internal output port 1040 of FIG. 10. One of the two physical channels of the internal input port 1140 is dedicated to data to be routed to the external output port 1102 in the South direction. The multiplexer/demultiplexer 1110, controlled by the arbiter 1108, routes the data received from the internal input port 1140 and the NAP responder 1142 and destined for the South external output port 1102 to the FIFOs 1112. The arbiter 1128 selects from the FIFOs 1112 to provide data to the external output port 1102.

One physical channel of the internal input port 1140 is dedicated to data to be routed to the NAP responder 1142. The data received on this physical channel is multiplexed with data received from the South external input port 1104 for the output channel of the external bidirectional port 1148, coupled with the NAP responder 1142. The multiplexing is performed by the multiplexer 1144, controlled by the arbiter 1122. The FIFO 1126 allows for buffering of output data.

The second stage switch 1132 and the switched input block 1106 provide data to the output block 1136, comprising multiplexers that select between the two inputs as controlled by the arbiter 1134. The outputs of the multiplexers fill the four FIFOs that correspond to the four physical channels of the output port 1138. Each one of the four physical channels of the output port 1138 corresponds to a different external output port of the sliced router. For example, one of the physical channels of the port 1138 may send traffic destined for a West external output port, one may send traffic destined for an East external output port, one may send traffic destined for a North external output port, and one may send traffic destined for a NAP initiator device.

Absent congestion, the slice 1100 may be able to route traffic from any of the input or bidirectional ports 1104, 1140, 1148 to any of the output or bidirectional ports 1102, 1138, 1148 in a single clock cycle. Thus, traffic between the NAP responder 1142 and the router coupled to the South may be processed in a single clock cycle, but traffic between the external ports 1102, 1104, 1148 of the slice 1100 and other external ports of the sliced router may incur additional delay from one or more other slices 800, 900, 1000 of FIGS. 8-10.

Figure 12:
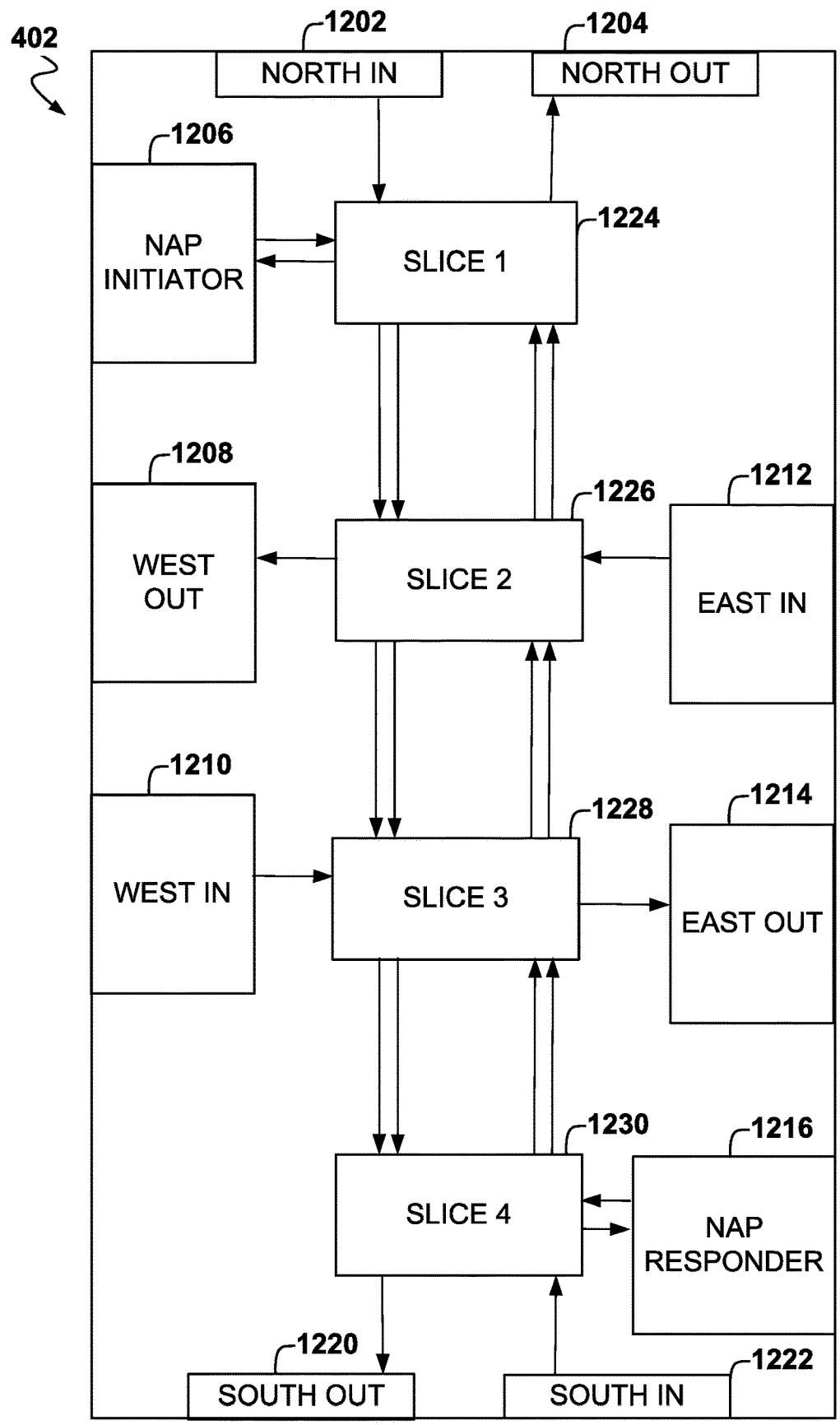
FIG. 12 illustrates connections among slices of the sliced router of FIG. 4, according to some example embodiments.

FIG. 12 illustrates connections among slices of the sliced router 402 of FIG. 4, according to some example embodiments. The North In 1202, South In 5122, West In 1210, and East In 1212 receive data directed to the sliced router 402 from adjacent routers in the North, South, West, and East directions. The North Out 1204, South Out 1220, West Out 1208, and East Out 1214 send data from the sliced router 402 to the adjacent routers in the North, South, West, and East directions. FIG. 12 adds additional detail to FIG. 4 by showing the slices 1224, 1226, 1228, and 1230 of the sliced router 402. The number and direction of the arrows connecting each pair of adjacent slices 1224-1230 corresponds to the number and direction of physical channels.

FIG. 12 shows an alternative embodiment to that shown in FIG. 5. In the embodiment of FIG. 5, the number of and direction of channels between adjacent slices differs for each pair of adjacent slices. In the embodiment of FIG. 12, each pair of adjacent slices uses two communication channels in each direction. Nonetheless, each of the slices 1224-1230 is customized for its unique role in the sliced router 402. For example, the slices 1224 and 1230 include bridges to communicate with NAPS, such as the bridge 830 of FIG. 8 and the bridge 1130 of FIG. 11. The slices 1226 and 1228 do not include such bridges. As another example, the slices 1224 and 1230 each include two ingress and two egress channels for communicating with adjacent slices. The slices 1226 and 1228 each include four ingress and four egress channels for communicating with adjacent slices.

The slice 1224 communicates bidirectionally with the router to the North via the North In 1202 and the North Out 1204. The slice 1224 also uses an external bidirectional port to communicate bidirectionally with the NAP initiator 1206. Thus, the slice 1224 has two external output ports and two external input ports. Two physical channels are provided from the slice 1224 to the slice 1226. Each physical channel may carry flits for two different output destination of flits received by the slice 1224 from the North In 1202 or the NAP initiator 1206. Since the slice 1224 handles output to the North Out 1204 and the NAP initiator 1206, the remaining output destinations are the West Out 1208, the East Out 1214, the South Out 1220, and the NAP responder 1216. In some example embodiments, one physical channel carries flits for the West Out 1208 and the East Out 1214 while the other physical channel carries flits for the South Out 1220 and the NAP responder 1216. Thus, there are two internal output connections (and channels of an internal output port) from the slice 1224 to the slice 1226. Likewise, the slice 1224 receives data from the slice 1226 destined for the North Out 1204 and the NAP initiator 1206. In some example embodiments, flits for these destinations are each received on a dedicated channel of an internal input port.

The slice 1226 receives input from the East In 1212 and provides output to the West Out 1208. As discussed above, the slice 1226 also communicates bidirectionally with the slice 1224. Additionally, the slice 1226 has a two physical output channels to the slice 1228. Flits being routed to the East Out 1214, the South Out 1220, and the NAP responder 1216 will be routed to the slice 1228. Flits being routed to the West Out 1208 are sent in that direction by the slice 1226 without further intermediation. Flits being routed to the North Out 1204 or the NAP initiator 1206 are routed to the slice 1224.

Each physical channel from the slice 1226 to the slice 1228 may carry flits for one or two different output destination of flits received by the slice 1226 from the slice 1224 or the East In 1212. Since the slices 1224 and 1226 handle output to the North Out 1204, the NAP initiator 1206, and the West Out 1208, the remaining output destinations are the East Out 1214, the South Out 1220, and the NAP responder 1216. In some example embodiments, one physical channel carries flits for the East Out 1214 while the other physical channel carries flits for the South Out 1220 and the NAP responder 1216.

Also, two internal physical channels are provided from the slice 1228 to the slice 1226. Each physical channel from the slice 1228 to the slice 1226 may carry flits for one or two different output destination of flits received by the slice 1228 from the slice 1230 or the West In 1210. Since the slices 1228 and 1230 handle output to the South Out 1220, the NAP responder 1216, and the East Out 1214, the remaining output destinations are the West Out 1208, the North Out 1204, and the NAP initiator 1206. In some example embodiments, one physical channel carries flits for the West Out 1208 while the other physical channel carries flits for the North Out 1204 and the NAP initiator 1206.

The slice 1228 receives external input from the West In 1210 and provides external output to the East Out 5124. As discussed above, the slice 1228 also communicates bidirectionally with the slice 1226. Additionally, the slice 1228 has a dedicated physical internal output channel to the slice 1230 for each output handled by the slice 1230. Flits being routed to the South Out 1220 and the NAP responder 1216 will be routed to the slice 1230. Flits being routed to the East Out 1214 are sent in that direction by the slice 1228 without further intermediation. Flits being routed to the North Out 1204, the West Out 1208, or the NAP initiator 1206 are routed to the slice 1226.

Two internal physical channels are also provided from the slice 1330 to the slice 1328. Each physical channel may carry flits for two different output destination of flits received by the slice 1230 from the South In 1222 or the NAP responder 1216. Since the slice 1230 handles output to the South Out 1220 and the NAP responder 1216, the remaining output destinations are the West Out 1208, the East Out 1214, the North Out 1204, and the NAP initiator 1206. In some example embodiments, one physical channel carries flits for the West Out 1208 and the East Out 1214 while the other physical channel carries flits for the North Out 1204 and the NAP initiator 1206. Thus, there are two internal output connections (and channels of an internal output port) from the slice 1230 to the slice 1228.

The slice 1230 communicates bidirectionally with the router to the South via the external South In 1222 and the external South Out 1220 ports. The slice 1230 also communicates bidirectionally with the external NAP responder 1216. As discussed above, there are internal physical channels to receive flits from the slice 1228 and send flits to the slice 1228, based on the destination of each flit.

As can be seen in FIG. 12, the number and type of connections for the four slices 1224-1230 differ. For example, the slices 1224 and 1230 each have four internal channels and four external channels while the slices 1226 and 1228 each have eight internal channels and two external channels.

Figure 13:
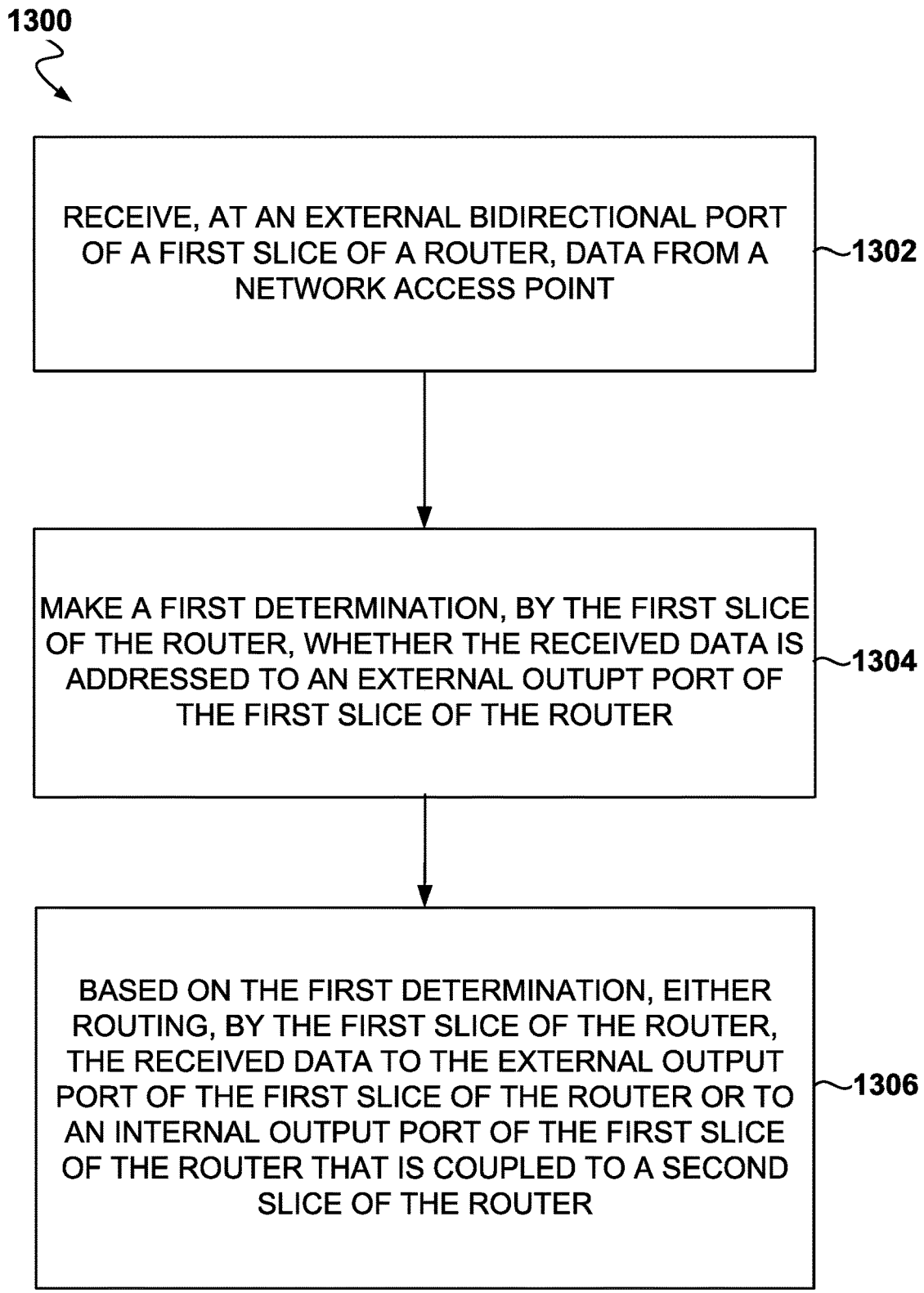
FIG. 13 is a flowchart of a method for routing packets by a slice of a sliced router, according to some example embodiments.

FIG. 13 is a flowchart of a method 1300 for routing packets by a slice of a sliced router, according to some example embodiments. The method 1300 includes operations 1302, 1304, and 1306. By way of example and not limitation, the method 1300 is described as being performed by the first slice 800 of FIG. 8, in communication with the NAP initiator 842 (also of FIG. 8) and the second slice 900 of FIG. 9.

In operation 1302, a first slice of a router (e.g., the first slice 800) receives, at an external bidirectional port (e.g., the port provided by the bridge 830), data from a NAP (e.g., the NAP initiator 842). For example, the NAP initiator 842 may send a series of flits comprising a command packet. The command packet may be destined for the NAP responder 1142 of FIG. 11 or for a NAP connected to a different router.

The first slice of the router, in operation 1304, makes a first determination whether the received data is addressed to an external output port of the first slice of the router. For example, the route compute 840 determines if the command packet is destined for a NAP responder that is reached via the North external output port 802.

In operation 1306, the first slice of the router, based on the determination, either routes the received data to the external output port of the first slice of the router or to an internal output port of the first slice that is coupled to a second slice of the router. For example, if the command packet is to be output via the North output port 802, the switch 828 directs the flits to the multiplexer/demultiplexer 810, for provision to the external output port 802. If not, the switch 828 directs the flits to the switch 838 for output on one of the physical channels of the internal output port 846, for handling by the second slice 900. The switch 838 selects one of the four physical channels of the internal output port 846 based on the destination external output port of the received data.

Thus, by use of the method 1300, a sliced router is enabled to direct traffic received on an input port to an output port either directly or indirectly. When the data received on an input port of a slice is destined for an output port of the same slice, the slice routes the data to the output port. When the data received on an input port of a slice is destined for an output port of a different slice, the slice routes the data to an internal, slice-to-slice, port.

If the received data is directed to the second slice 900 via the internal output port 846, the second slice 900 of the sliced router may continue processing of the received data. For example, the second slice 900 may make a determination whether the received data is addressed to an external output port of the second slice 900 (e.g., the West external output port 902) or to another external output port of the sliced router. Based on the second determination, the second slice 900 either routes the received data to the external output port of the second slice of the router or to one of the physical channels of an internal output port (e.g., the internal output port 940) of the second slice 900 of the router that is coupled to the third slice 1000 of the router.

If the received data is directed to the third slice 1000 via the internal output port 940, the third slice 1000 of the sliced router may continue processing of the received data. For example, the third slice 1000 may make a determination whether the received data is addressed to an external output port of the third slice 1000 (e.g., the East external output port 1002) or to another external output port of the sliced router. Based on the second determination, the third slice 1000 either routes the received data to the external output port of the third slice of the router or to one of the physical channels of an internal output port (e.g., the internal output port 1040) of the third slice 1000 of the router that is coupled to the fourth slice 1100 of the router.

Data received by the fourth slice 1100 on the internal input port 1140 is destined for output on an external output port of the fourth slice 1100. Based on the physical channel of the internal input port 1140 on which the data is received, the fourth slice 1100 routes the received data to either the bridge 1130 or the South external output port 1102.

Example 1 is a router comprising: a first slice comprising a first external input port, a first external output port, a first internal input port, a first internal output port, and a bidirectional port coupled to a network access point, a number of channels of the first internal input port being equal to the sum of a number of channels of the first external output port and a number of output channels of the bidirectional port; and a second slice comprising a second external input port, a second external output port, a second internal output port coupled to the first internal input port, and a second internal input port coupled to the first internal output port.

In Example 2, the subject matter of Example 1, wherein the first external input port of the first slice is coupled to an external output port of another router.

In Example 3, the subject matter of Examples 1-2, wherein a number of channels of the first internal output port is different than a number of channels of the second internal output port.

In Example 4, the subject matter of Examples 1-3 includes a third slice comprising a third external input port, a third external output port, a third internal input port, and a third internal output port; wherein: the second slice further comprises a fourth internal input port and a fourth internal output port; the third internal input port is coupled to the fourth internal output port; and the third internal output port is coupled to the fourth internal input port.

In Example 5, the subject matter of Example 4, wherein a number of channels of the first internal output port is equal to the sum of a number of channels of the second external output port and a number of channels of the fourth internal output port.

In Example 6, the subject matter of Example 5, wherein: the number of channels of the first internal output port is different than a number of channels of the first internal input port; and a number of channels of the fourth internal output port is the same as a number of channels the fourth internal input port.

In Example 7, the subject matter of Examples 4-6 includes a fourth slice comprising a fourth external input port, a fourth external output port, a fifth internal input port, and a fifth internal output port; wherein: the third slice further comprises a sixth internal input port and a sixth internal output port; the fifth internal input port is coupled to the sixth internal output port; and the fifth internal output port is coupled to the sixth internal input port.

In Example 8, the subject matter of Example 7, wherein: the four slices are disposed in a rectangular portion of a circuit, the rectangular portion defined by a first measurement in a first direction and a second measurement in a second direction that is orthogonal to the first direction; and the first measurement is at least twice the second measurement.

In Example 9, the subject matter of Example 8, wherein: data transfers in the second direction complete in one clock cycle; and data transfers in the first direction take multiple clock cycles to complete.

In Example 10, the subject matter of Examples 8-9, wherein the first measurement is at least three times the second measurement.

In Example 11, the subject matter of Examples 8-10, wherein the first measurement is at least four times the second measurement.

In Example 12, the subject matter of Examples 7-11, wherein: the four slices are disposed in a rectangular portion of a circuit that comprises a North side, a South side, a West side, and an East side; the first external input port is on the North side; the first external output port is on the North side; the second external input port is on the West side; and the second external output port is on the East side.

In Example 13, the subject matter of Example 12, wherein: the third external input port is on the East side; and the third external output port is on the West side.

In Example 14, the subject matter of Example 13, wherein: the fourth external input port is on the South side; and the fourth external output port is on the South side.

In Example 15, the subject matter of Examples 7-14, wherein: the first external input port of the first slice is coupled to an external output port of a second router; the first slice further comprises a bidirectional port coupled to a first network access point; the fifth external input port of the fourth slice is coupled to an external output port of a third router; and the fourth slice further comprises a second bidirectional port coupled to a second network access point.

In Example 16, the subject matter of Example 15, wherein: the first network access point is an initiator; and the second network access point is a responder.

Example 17 is a method comprising: receiving, at an external bidirectional port of a first slice of a router, data from a network access point; making a first determination, by the first slice of the router, whether the received data is addressed to an external output port of the first slice of the router; and based on the first determination, either routing, by the first slice of the router, the received data to the external output port of the first slice of the router or to an internal output port of the first slice of the router that is coupled to a second slice of the router.

In Example 18, the subject matter of Example 17 includes, based on a physical channel of the internal output port of the first slice of the router on which the received data is received by the second slice of the router, either routing, by the second slice of the router, the received data to an external output port of the second slice of the router or to an internal output port of the second slice of the router that is coupled to a third slice of the router.

In Example 19, the subject matter of Example 18 includes, based on a second physical channel of the internal output port of the second slice of the router on which the received data is received by the third slice of the router, either routing, by the third slice of the router, the received data to an external output port of the third slice of the router or to an internal output port of the third slice of the router that is coupled to a fourth slice of the router.

In Example 20, the subject matter of Example 19 includes, based on a third physical channel of the internal output port of the third slice of the router on which the received data is received by the fourth slice of the router, either routing, by the fourth slice of the router, the received data to a first external output port or to a second external bidirectional port.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

Figure 14:
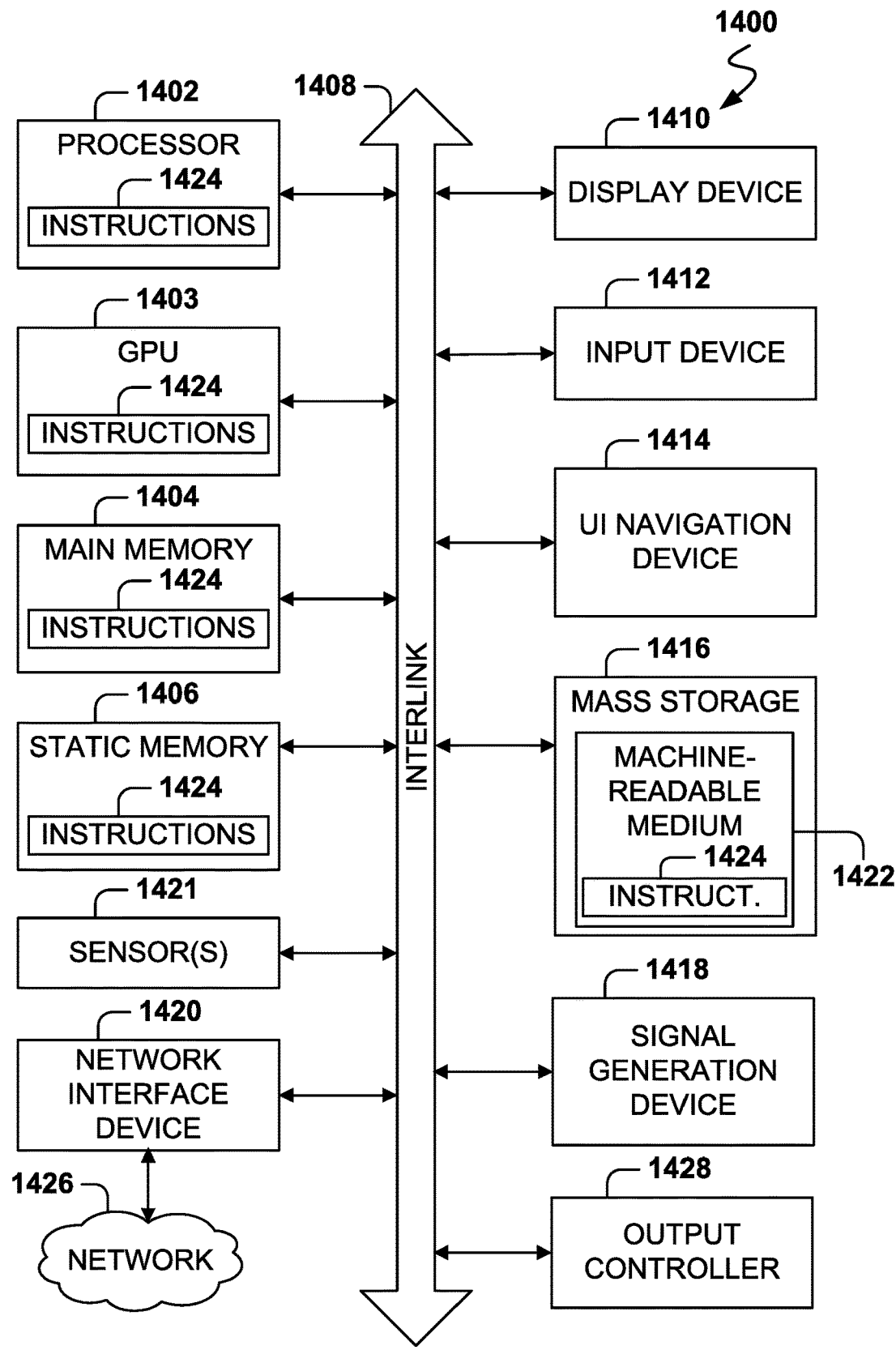
FIG. 14 is a block diagram illustrating an example of a machine upon or by which one or more example process embodiments described herein may be implemented or controlled.

FIG. 14 is a block diagram illustrating an example of a machine 1400 upon or by which one or more example process embodiments described herein may be implemented or controlled. In alternative embodiments, the machine 1400 may operate as a standalone device or may be connected (e.g., networked) to other machines. In a networked deployment, the machine 1400 may operate in the capacity of a server machine, a client machine, or both in server-client network environments. In an example, the machine 1400 may act as a peer machine in a peer-to-peer (P2P) (or other distributed) network environment. Further, while only a single machine 1400 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, a number of components, or mechanisms. Circuitry is a collection of circuits implemented in tangible entities that include hardware (e.g., simple circuits, gates, logic). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits) including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 1400 may include a hardware processor 1402 (e.g., a central processing unit (CPU), a hardware processor core, or any combination thereof), a graphics processing unit (GPU) 1403, a main memory 1404, and a static memory 1406, some or all of which may communicate with each other via an interlink (e.g., bus) 1408. The machine 1400 may further include a display device 1410, an alphanumeric input device 1412 (e.g., a keyboard), and a user interface (UI) navigation device 1414 (e.g., a mouse). In an example, the display device 1410, alphanumeric input device 1412, and UI navigation device 1414 may be a touch screen display. The machine 1400 may additionally include a mass storage device (e.g., drive unit) 1416, a signal generation device 1418 (e.g., a speaker), a network interface device 1420, and one or more sensors 1421, such as a Global Positioning System (GPS) sensor, compass, accelerometer, or another sensor. The machine 1400 may include an output controller 1428, such as a serial (e.g., universal serial bus (USB)), parallel, or other wired or wireless (e.g., infrared (IR), near field communication (NFC)) connection to communicate with or control one or more peripheral devices (e.g., a printer, card reader).

The mass storage device 1416 may include a machine-readable medium 1422 on which is stored one or more sets of data structures or instructions 1424 (e.g., software) embodying or utilized by any one or more of the techniques or functions described herein. The instructions 1424 may also reside, completely or at least partially, within the main memory 1404, within the static memory 1406, within the hardware processor 1402, or within the GPU 1403 during execution thereof by the machine 1400. In an example, one or any combination of the hardware processor 1402, the GPU 1403, the main memory 1404, the static memory 1406, or the mass storage device 1416 may constitute machine-readable media.

While the machine-readable medium 1422 is illustrated as a single medium, the term "machine-readable medium" may include a single medium, or multiple media, (e.g., a centralized or distributed database, and/or associated caches and servers) configured to store the one or more instructions 1424.

The term "machine-readable medium" may include any medium that is capable of storing, encoding, or carrying instructions 1424 for execution by the machine 1400 and that cause the machine 1400 to perform any one or more of the techniques of the present disclosure, or that is capable of storing, encoding, or carrying data structures used by or associated with such instructions 1424. Non-limiting machine-readable medium examples may include solid-state memories, and optical and magnetic media. In an example, a massed machine-readable medium comprises a machine-readable medium 1422 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1424 may further be transmitted or received over a communications network 1426 using a transmission medium via the network interface device 1420.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A router comprising:
a first slice comprising a first external input port, a first external output port, a first internal input port, a first internal output port, and a bidirectional port coupled to a network access point, a number of channels of the first internal input port being equal to the sum of a number of channels of the first external output port and a number of output channels of the bidirectional port; and
a second slice comprising a second external input port, a second external output port, a second internal output port coupled to the first internal input port, and a second internal input port coupled to the first internal output port.

2. The router of claim 1, wherein the first external input port of the first slice is coupled to an external output port of another router.

3. The router of claim 1, wherein a number of channels of the first internal output port is different than a number of channels of the second internal output port.

4. The router of claim 1, further comprising:
a third slice comprising a third external input port, a third external output port, a third internal input port, and a third internal output port;
wherein:
the second slice further comprises a fourth internal input port and a fourth internal output port;
the third internal input port is coupled to the fourth internal output port; and
the third internal output port is coupled to the fourth internal input port.

5. The router of claim 4, wherein a number of channels of the first internal output port is equal to the sum of a number of channels of the second external output port and a number of channels of the fourth internal output port.

6. The router of claim 5, wherein:
the number of channels of the first internal output port is different than a number of channels of the first internal input port; and
a number of channels of the fourth internal output port is the same as a number of channels the fourth internal input port.

7. The router of claim 4, further comprising:
a fourth slice comprising a fourth external input port, a fourth external output port, a fifth internal input port, and a fifth internal output port;
wherein:
the third slice further comprises a sixth internal input port and a sixth internal output port;
the fifth internal input port is coupled to the sixth internal output port; and the fifth internal output port is coupled to the sixth internal input port.

8. The router of claim 7, wherein:

the four slices are disposed in a rectangular portion of a circuit, the rectangular portion defined by a first measurement in a first direction and a second measurement in a second direction that is orthogonal to the first direction; and the first measurement is at least twice the second measurement.

9. The router of claim 8, wherein:

data transfers in the second direction complete in one clock cycle; and data transfers in the first direction take multiple clock cycles to complete.

10. The router of claim 8, wherein the first measurement is at least three times the second measurement.

11. The router of claim 8, wherein the first measurement is at least four times the second measurement.

12. The router of claim 7, wherein:

the four slices are disposed in a rectangular portion of a circuit that comprises a North side, a South side, a West side, and an East side;

the first external input port is on the North side;

the first external output port is on the North side;

the second external input port is on the West side; and the second external output port is on the East side.

13. The router of claim 12, wherein:

the third external input port is on the East side; and the third external output port is on the West side.

14. The router of claim 13, wherein:

the fourth external input port is on the South side; and the fourth external output port is on the South side.

15. The router of claim 7, wherein:

the first external input port of the first slice is coupled to an external output port of a second router;

the first slice further comprises a bidirectional port coupled to a first network access point;

the fifth external input port of the fourth slice is coupled to an external output port of a third router; and the fourth slice further comprises a second bidirectional port coupled to a second network access point.

16. The router of claim 15, wherein:

the first network access point is an initiator; and the second network access point is a responder.

* * * * *